US011267069B2

(12) United States Patent
Nadler et al.

(10) Patent No.: US 11,267,069 B2
(45) Date of Patent: Mar. 8, 2022

(54) RECOGNITION OF COMPONENTS FOR WELDING AND CUTTING TORCHES

(71) Applicant: The ESAB Group Inc., Florence, SC (US)

(72) Inventors: Michael Nadler, Wilmot, NH (US); Maximilian Dougherty, Royalton, VT (US); Frederic Ewing, Huntington, NY (US); James Tantillo, Enfield, NH (US); Ryan T. Lynaugh, Cornish, NH (US); Kevin Horner-Richardson, Cornish, NH (US); Nicholas Courtney, Sunnyvale, CA (US)

(73) Assignee: THE ESAB GROUP INC., Annapolis Junction, MD (US)

( * ) Notice: Subject to any disclaimer, the term of this patent is extended or adjusted under 35 U.S.C. 154(b) by 235 days.

(21) Appl. No.: 16/582,122

(22) Filed: Sep. 25, 2019

(65) Prior Publication Data

US 2020/0016677 A1 Jan. 16, 2020

Related U.S. Application Data

(63) Continuation-in-part of application No. 16/448,903, filed on Jun. 21, 2019, which is a continuation-in-part
(Continued)

(51) Int. Cl.
*B23K 10/00* (2006.01)
(52) U.S. Cl.
CPC .................................. *B23K 10/006* (2013.01)
(58) Field of Classification Search
CPC ....... B23K 10/006; B23K 10/00; B23K 10/02
(Continued)

(56) References Cited

U.S. PATENT DOCUMENTS 5,357,076 A 10/1994 Blankenship
5,692,700 A 12/1997 Bobeczko
(Continued)

FOREIGN PATENT DOCUMENTS

CN 104472021 A 3/2015
CN 104874900 A 9/2015
(Continued)

OTHER PUBLICATIONS

Communication Pursuant to Article 94(3) from the European Patent Office for European Patent Application No. 19166758.3 dated Apr. 30, 2020, 4 pages.
(Continued)

*Primary Examiner* — Jimmy Chou
(74) *Attorney, Agent, or Firm* — Edell, Shapiro & Finnan, LLC

(57) ABSTRACT

Recognizing interchangeable torch components, such as consumables, for welding and cutting torches includes determining that one or more interchangeable torch components installed in an operative end of a torch are genuine. Operational parameters for the one or more interchangeable torch components can also be determined. When the one or more interchangeable torch components are determined to be genuine, an indicator assembly can be activated to provide a first indication. When the operational parameters are implemented at a power supply connected to the torch, the indicator assembly can be activated to provide a second indication.

20 Claims, 22 Drawing Sheets

Related U.S. Application Data of application No. 15/947,258, filed on Apr. 6, 2018, now Pat. No. 10,625,359.

(58) Field of Classification Search
USPC .......... 219/121.39, 121.44, 121.45, 121.54
See application file for complete search history.

(56) References Cited

U.S. PATENT DOCUMENTS

| | | | |
|---|---|---|---|
| 5,841,095 A | 11/1998 | Lu et al. | |
| 5,886,315 A | 3/1999 | Lu et al. | |
| 5,989,485 A | 11/1999 | Staacks et al. | |
| 6,091,048 A | 7/2000 | Lanouette et al. | |
| 6,093,905 A | 7/2000 | Hardwick | |
| 6,163,008 A | 12/2000 | Roberts et al. | |
| 6,163,009 A | 12/2000 | Hardwick | |
| 6,236,013 B1 | 5/2001 | Delzenne | |
| 6,315,186 B1 | 11/2001 | Friedl et al. | |
| 6,320,156 B1 | 11/2001 | Yamaguchi et al. | |
| 6,326,583 B1 | 12/2001 | Hardwick | |
| 6,359,251 B1 | 3/2002 | Picard | |
| 6,424,082 B1 | 7/2002 | Hackett et al. | |
| 6,477,623 B2 | 11/2002 | Jeddeloh | |
| 6,498,317 B2 | 12/2002 | Hardwick | |
| 6,552,303 B1 | 4/2003 | Blankenship et al. | |
| 6,563,087 B1 | 5/2003 | Yokoyama et al. | |
| 6,622,058 B1 | 9/2003 | Picard et al. | |
| 6,677,551 B2 | 1/2004 | Hardwick | |
| 6,707,304 B2 | 3/2004 | Bühler et al. | |
| 6,710,299 B2 | 3/2004 | Blankenship | |
| 6,772,040 B1 | 8/2004 | Picard | |
| 6,847,009 B2 | 1/2005 | Stuart et al. | |
| 6,858,817 B2 | 2/2005 | Blankenship | |
| 6,888,092 B2 | 5/2005 | Walters | |
| 6,888,093 B2 | 5/2005 | Hardwick | |
| 6,900,408 B2 | 5/2005 | Picard | |
| 6,903,300 B2 | 6/2005 | Faust et al. | |
| 6,936,786 B2 | 8/2005 | Hewett et al. | |
| 6,947,802 B2 | 9/2005 | Picard | |
| 6,974,929 B2 | 12/2005 | Walters | |
| 6,979,796 B1 | 12/2005 | Hardwick | |
| 6,987,237 B2 | 1/2006 | Walters | |
| 6,987,238 B2 | 1/2006 | Horner-Richardson et al. | |
| 6,989,505 B2 | 1/2006 | MacKenzie et al. | |
| 6,992,262 B2 | 1/2006 | Matus et al. | |
| 6,998,566 B2 | 2/2006 | Conway et al. | |
| 7,005,600 B2 | 2/2006 | Conway et al. | |
| 7,019,254 B2 | 3/2006 | MacKenzie et al. | |
| 7,032,814 B2 | 4/2006 | Blankenship | |
| 7,034,244 B2 | 4/2006 | Matus | |
| 7,071,443 B2 | 7/2006 | Conway et al. | |
| 7,084,367 B2 | 8/2006 | Sommerfeld et al. | |
| 7,112,759 B1 | 9/2006 | Severance, Jr. | |
| 7,145,098 B2 | 12/2006 | MacKenzie et al. | |
| 7,161,111 B2 | 1/2007 | Schneider | |
| 7,186,944 B2 | 3/2007 | Matus et al. | |
| 7,256,366 B2 | 8/2007 | Severance, Jr. | |
| 7,291,808 B2 | 11/2007 | Burgstaller et al. | |
| 7,358,458 B2 | 4/2008 | Daniel | |
| 7,429,715 B2 | 9/2008 | MacKenzie et al. | |
| 7,615,719 B2 | 11/2009 | Shipulski | |
| 7,615,720 B2 | 11/2009 | Sanders | |
| 7,781,699 B2 | 8/2010 | Schneider | |
| 7,807,937 B2 | 10/2010 | Schneider | |
| 7,989,727 B2 | 8/2011 | Twarog | |
| 8,089,025 B2 | 1/2012 | Sanders | |
| 8,153,927 B2 | 4/2012 | Twarog | |
| 8,203,096 B2 | 6/2012 | Sanders et al. | |
| 8,258,424 B2 | 9/2012 | Griffin | |
| 8,263,896 B2 | 9/2012 | Schneider | |
| 8,278,588 B2 | 10/2012 | Salsich et al. | |
| 8,307,717 B2 | 11/2012 | Buchman | |
| 8,350,182 B2 | 1/2013 | Shipulski et al. | |
| 8,378,249 B2 | 2/2013 | Salsich et al. | |
| 8,395,076 B2 | 3/2013 | Matus | |
| 8,431,862 B2 * | 4/2013 | Kachline | B23K 9/28 219/130.01 |
| 8,624,150 B2 | 1/2014 | Simek | |
| 8,633,415 B2 | 1/2014 | Griffin | |
| 8,680,434 B2 | 3/2014 | Stöger et al. | |
| 8,686,318 B2 | 4/2014 | Albrecht et al. | |
| 8,710,396 B2 | 4/2014 | Salsich et al. | |
| 8,754,348 B2 | 6/2014 | Salsich et al. | |
| 8,763,473 B2 | 7/2014 | Buchman | |
| 8,853,588 B2 | 10/2014 | Mao et al. | |
| 8,866,038 B2 | 10/2014 | Lindsay et al. | |
| 8,890,021 B2 | 11/2014 | Shipulski et al. | |
| 8,921,731 B2 | 12/2014 | Krink et al. | |
| 8,981,253 B2 | 3/2015 | Shipulski | |
| 9,040,868 B2 | 5/2015 | Leiteritz et al. | |
| 9,067,271 B2 | 6/2015 | Kadlec et al. | |
| 9,073,139 B2 | 7/2015 | Christopher et al. | |
| 9,079,265 B2 | 7/2015 | Reinke et al. | |
| 9,131,596 B2 | 9/2015 | Conway et al. | |
| 9,138,824 B2 | 9/2015 | Giese | |
| 9,144,882 B2 | 9/2015 | Lindsay | |
| 9,180,546 B2 | 11/2015 | Jarvis | |
| 9,199,330 B2 | 12/2015 | Hassan et al. | |
| 9,266,182 B2 | 2/2016 | Hung et al. | |
| 9,368,045 B2 | 6/2016 | Becker | |
| 9,395,715 B2 | 7/2016 | Brandt | |
| 9,415,459 B2 | 8/2016 | Bomemann et al. | |
| 9,457,419 B2 | 10/2016 | Namburu | |
| 9,481,050 B2 | 11/2016 | Brine et al. | |
| 9,560,732 B2 | 1/2017 | Shipulski | |
| 9,583,014 B2 | 2/2017 | Becker | |
| 9,583,023 B2 | 2/2017 | Becker et al. | |
| 9,589,481 B2 | 3/2017 | Becker et al. | |
| 9,609,733 B2 | 3/2017 | Severance, Jr. | |
| 9,636,768 B2 | 5/2017 | Rozmarynowski | |
| 9,642,236 B2 | 5/2017 | Mather | |
| 9,643,273 B2 | 5/2017 | Adams et al. | |
| 9,662,747 B2 | 5/2017 | Darrow | |
| 9,672,460 B2 * | 6/2017 | Hoffa | B23K 5/00 |
| 9,686,848 B2 | 6/2017 | Namburu | |
| 9,713,852 B2 | 7/2017 | Becker et al. | |
| 9,724,787 B2 | 8/2017 | Becker et al. | |
| 9,737,953 B2 | 8/2017 | Chantry | |
| 9,737,954 B2 * | 8/2017 | Hoffa | H05H 1/38 |
| 9,781,816 B2 | 10/2017 | Cook et al. | |
| 9,782,852 B2 | 10/2017 | Mao et al. | |
| 9,981,335 B2 | 5/2018 | Sanders et al. | |
| 10,010,959 B2 | 7/2018 | Daniel | |
| 10,056,010 B2 | 8/2018 | Salsich et al. | |
| 10,105,782 B2 | 10/2018 | Becker et al. | |
| 10,144,080 B2 | 12/2018 | Chantry et al. | |
| 10,170,019 B2 | 1/2019 | Becker et al. | |
| 10,201,869 B2 | 2/2019 | Enyedy et al. | |
| 10,210,773 B2 | 2/2019 | Becker et al. | |
| 10,245,672 B2 | 4/2019 | Kachline | |
| 10,272,575 B2 | 4/2019 | Pedersen et al. | |
| 10,625,359 B2 * | 4/2020 | Nadler | B23K 9/095 |
| 2005/0035093 A1 * | 2/2005 | Yamaguchi | B23K 10/00 219/121.39 |
| 2005/0109738 A1 * | 5/2005 | Hewett | H05H 1/34 219/121.48 |
| 2006/0049152 A1 | 3/2006 | Matus | |
| 2006/0163216 A1 | 7/2006 | Brandt et al. | |
| 2008/0023449 A1 | 1/2008 | Salsich et al. | |
| 2009/0008370 A1 | 1/2009 | Salsich et al. | |
| 2009/0057286 A1 | 3/2009 | Ihara et al. | |
| 2009/0294413 A1 * | 12/2009 | Salsich | B23K 10/00 219/121.39 |
| 2010/0155377 A1 * | 6/2010 | Lindsay | B23K 31/10 219/121.44 |
| 2011/0220616 A1 | 9/2011 | Mehn | |
| 2011/0220619 A1 * | 9/2011 | Mehn | B23K 9/0956 219/108 |
| 2013/0112660 A1 | 5/2013 | Enyedy et al. | |
| 2013/0119036 A1 | 5/2013 | Daniel | |
| 2013/0119037 A1 | 5/2013 | Daniel | |
| 2013/0200056 A1 | 8/2013 | Kachline | |
| 2013/0200058 A1 | 8/2013 | Kachline | |

(56) References Cited

U.S. PATENT DOCUMENTS

| | | | |
|---|---|---|---|
| 2013/0263420 A1* | 10/2013 | Shipulski | B23K 10/006 29/407.01 |
| 2013/0264317 A1* | 10/2013 | Hoffa | B23K 10/00 219/121.53 |
| 2013/0264320 A1* | 10/2013 | Shipulski | B23K 9/32 219/130.01 |
| 2013/0288211 A1 | 10/2013 | Patterson et al. | |
| 2014/0021172 A1 | 1/2014 | Sanders | |
| 2014/0021175 A1* | 1/2014 | Chen | H05H 1/34 219/121.49 |
| 2014/0048517 A1* | 2/2014 | Davidson | B23K 9/10 219/121.54 |
| 2014/0061170 A1* | 3/2014 | Lindsay | B23K 26/38 219/121.54 |
| 2014/0069895 A1* | 3/2014 | Brine | B23K 10/006 219/121.44 |
| 2014/0166629 A1* | 6/2014 | Kadlec | B23K 9/1087 219/121.39 |
| 2014/0190944 A1 | 7/2014 | Salsich et al. | |
| 2015/0154884 A1 | 6/2015 | Salsich et al. | |
| 2015/0158109 A1 | 6/2015 | Chantry | |
| 2015/0181686 A1 | 6/2015 | Schulze | |
| 2015/0269603 A1* | 9/2015 | Young, Jr. | H05H 1/36 705/14.27 |
| 2015/0283640 A1 | 10/2015 | Walker | |
| 2015/0319835 A1 | 11/2015 | Sanders | |
| 2015/0319836 A1 | 11/2015 | Sanders | |
| 2015/0328710 A1 | 11/2015 | Kachline | |
| 2015/0332071 A1* | 11/2015 | Hoffa | B23K 26/38 340/10.2 |
| 2015/0343555 A1* | 12/2015 | Gullotta | B23K 10/006 219/121.54 |
| 2015/0379894 A1 | 12/2015 | Becker et al. | |
| 2016/0050740 A1 | 2/2016 | Zhang | |
| 2016/0125764 A1 | 5/2016 | Becker | |
| 2016/0136764 A1 | 5/2016 | Enyedy et al. | |
| 2016/0144445 A1 | 5/2016 | Hung et al. | |
| 2016/0165711 A1 | 6/2016 | Zhang | |
| 2016/0165712 A1 | 6/2016 | Zhang | |
| 2016/0228972 A1 | 8/2016 | Jogdand | |
| 2016/0346862 A1 | 12/2016 | Bornemann et al. | |
| 2016/0375524 A1 | 12/2016 | Hsu | |
| 2017/0001255 A1 | 1/2017 | Winn | |
| 2017/0036290 A1 | 2/2017 | Enyedy et al. | |
| 2017/0042011 A1 | 2/2017 | Sanders | |
| 2017/0042012 A1 | 2/2017 | Sanders et al. | |
| 2017/0042013 A1 | 2/2017 | Sanders | |
| 2017/0042014 A1 | 2/2017 | Sanders et al. | |
| 2017/0042016 A1 | 2/2017 | Mitra | |
| 2017/0057003 A1 | 3/2017 | Giezewski | |
| 2017/0095879 A1 | 4/2017 | Mitra | |
| 2017/0124360 A1 | 5/2017 | Young, Jr. | |
| 2017/0148352 A1 | 5/2017 | Becker | |
| 2017/0165776 A1 | 6/2017 | Becker et al. | |
| 2017/0169729 A1 | 6/2017 | Becker et al. | |
| 2017/0181261 A1 | 6/2017 | Roberts | |
| 2017/0188445 A1 | 6/2017 | Yamaguchi et al. | |
| 2017/0280547 A1 | 9/2017 | Mitra | |
| 2017/0282274 A1 | 10/2017 | Knoener et al. | |
| 2017/0282281 A1 | 10/2017 | Fochesatto | |
| 2017/0291244 A1 | 10/2017 | Peters | |
| 2017/0295635 A1 | 10/2017 | Peters | |
| 2017/0295636 A1 | 10/2017 | Mitra | |
| 2017/0295637 A1 | 10/2017 | Peters | |
| 2017/0312845 A1 | 11/2017 | Chantry | |
| 2018/0007773 A1 | 1/2018 | Twarog et al. | |
| 2018/0161910 A1 | 6/2018 | Enyedy et al. | |
| 2018/0178310 A1 | 6/2018 | Jogdand et al. | |
| 2018/0185947 A1 | 7/2018 | Knoener et al. | |
| 2018/0228013 A1 | 8/2018 | Zhang et al. | |
| 2018/0250765 A1 | 9/2018 | Sanders et al. | |
| 2018/0301059 A1 | 10/2018 | Becker et al. | |
| 2019/0005846 A1 | 1/2019 | Salsich et al. | |
| 2019/0035306 A1 | 1/2019 | Becker et al. | |
| 2019/0076950 A1 | 3/2019 | Becker et al. | |

FOREIGN PATENT DOCUMENTS

| | | |
|---|---|---|
| CN | 205074659 A | 3/2016 |
| CN | 107107264 A | 8/2017 |
| CN | 107172878 A | 9/2017 |
| CN | 108274141 A | 7/2018 |
| EP | 1117279 A1 | 7/2001 |
| EP | 2835041 B1 | 2/2015 |
| EP | 3189923 A1 | 7/2017 |
| JP | 2015515381 A | 5/2015 |
| JP | 6269859 B2 | 1/2018 |
| KR | 10-2015-0001789 A | 1/2015 |
| WO | 0044523 A1 | 8/2000 |
| WO | 03089179 A1 | 10/2003 |
| WO | 2012052231 A1 | 4/2012 |
| WO | 2013151886 A2 | 10/2013 |
| WO | 2015172140 A1 | 11/2015 |
| WO | 2015172142 A1 | 11/2015 |
| WO | 2016093053 A1 | 4/2017 |
| WO | 2018070117 A1 | 4/2018 |
| WO | 2018157052 A1 | 8/2018 |

OTHER PUBLICATIONS

Dzieza, Josh, "Inside Keurig's plan to stop you from buying knockoff K-Cups," The Verge, Jun. 30, 2014, accessible at https://www.theverge.com/2014/6/30/5857030/keurig-digital-rights-management-coffee-pod-pirates, 5 pages.

Storm, Darlene, "Keurig 2.0 spoofing vulnerability: Hack bypasses coffee DRM, allows brewing of any pod" Computerworld, Dec. 10, 2014, accessible at https://www.computerworld.com/article/2857708/keurig-2-0-spoofing-vulnerability-hack-bypasses-coffee-drm-allows-brewing-of-any-pod.html, 5 pages.

Welding Outfitter, Tweco PulseMaster 350 Amp MIG Gun—Tweco Style with "Smart" Display-Weldingoutfitter.com, accessed on May 9, 2019, https://www.weldingoutfitter.com/products/tweco-pulsemaster-350-amp-mig-gun-tweco-style-with-smart-digital-display?variant=12091360280652, 4 pages.

Extended European Search Report in corresponding EP Application No. 19166758.3, dated Aug. 2, 2019, 8 pages.

Notification of First Office Action for Chinese Patent Application No. 201910268233.2 dated Dec. 11, 2020 with English translation, 16 pages.

Notice of Preliminary Rejection for Korean Patent Application No. 10-2019-0040238 with English translation dated Apr. 30, 2020, 11 pages.

Office Action for Canadian Patent Application No. 3,038,788 dated Mar. 9, 2020, 7 pages.

Examination Report No. 1 for Australian Patent Application No. 2019202346 dated Mar. 10, 2020, 3 pages.

Notification of Second Office Action for Chinese Patent Application No. 201910268233.2 dated Aug. 12, 2021 with English translation, 24 pages.

Communication Pursuant to Article 94(3) from the European Patent Office for European Patent Application No. 19166758.3 dated Oct. 30, 2020, 4 pages.

Notice of Reason for Rejection from the Japanese Patent Office for Japanese Patent Application No. 2019-072921 dated Oct. 20, 2020 with English translation, 15 pages.

* cited by examiner

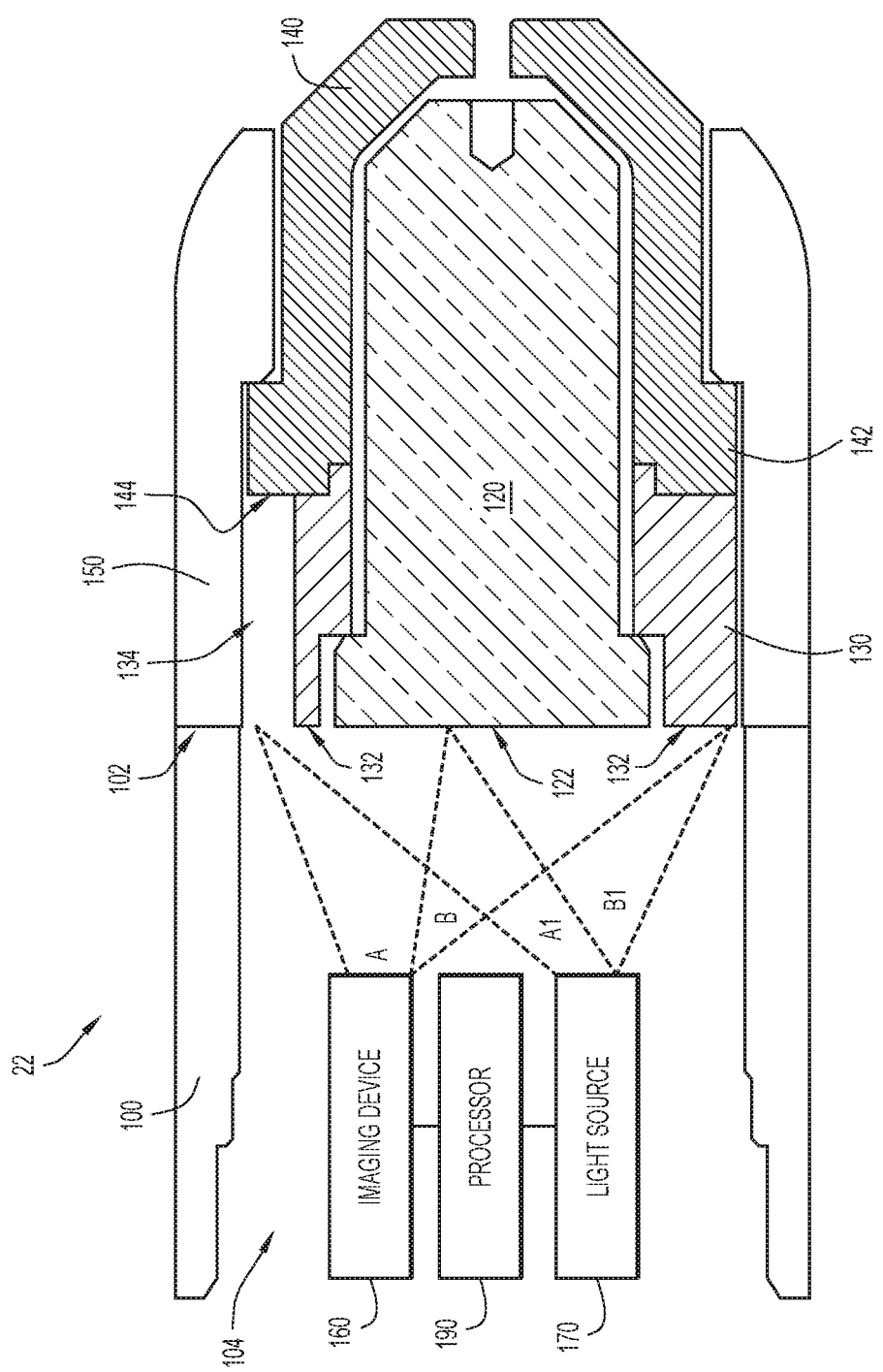

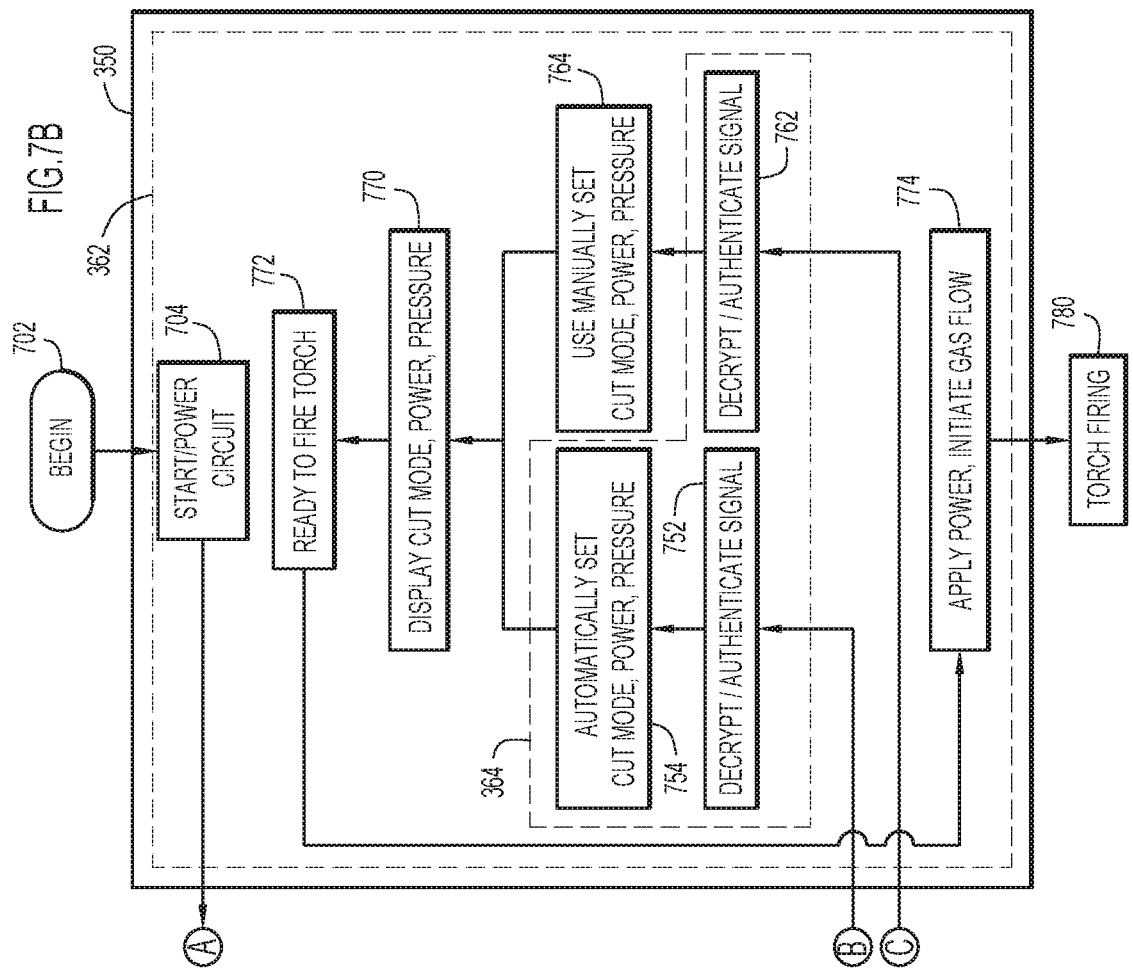

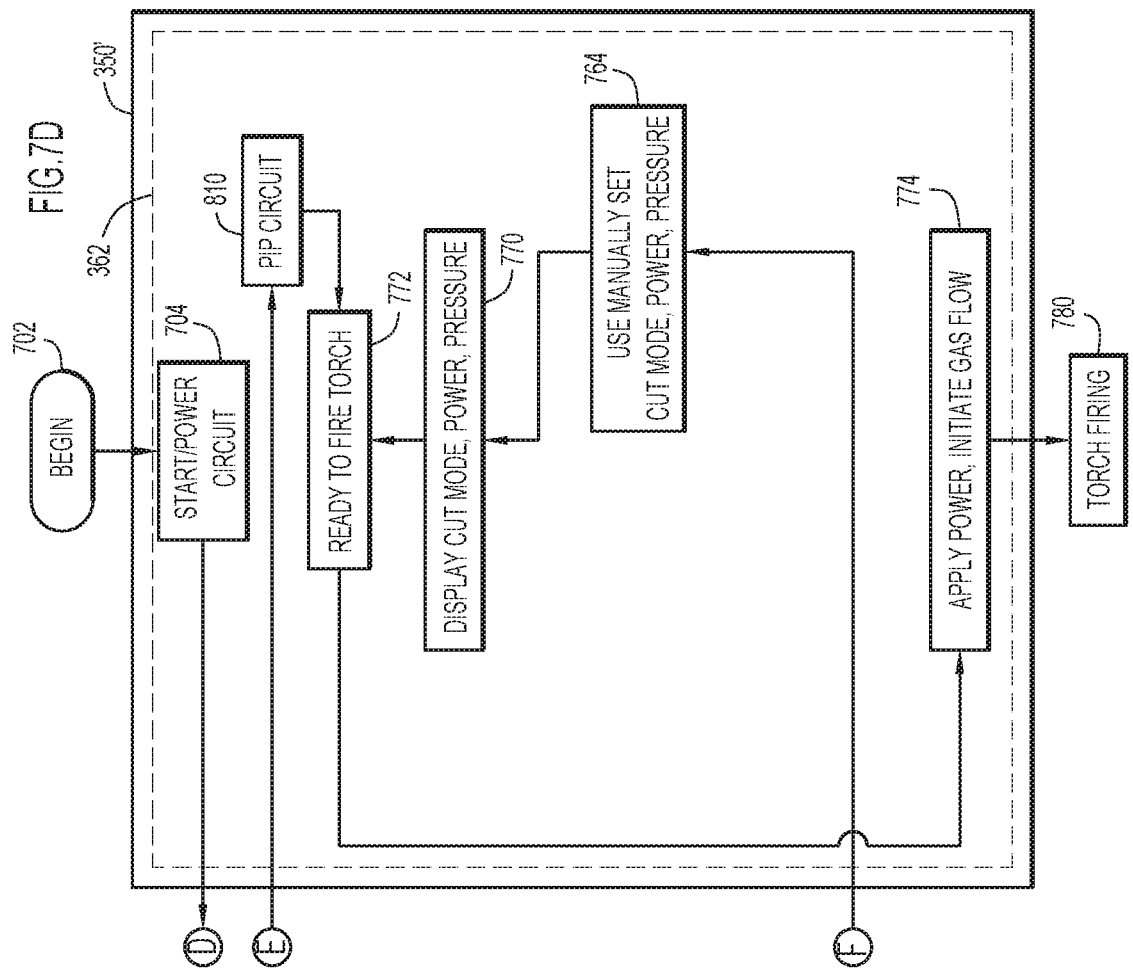

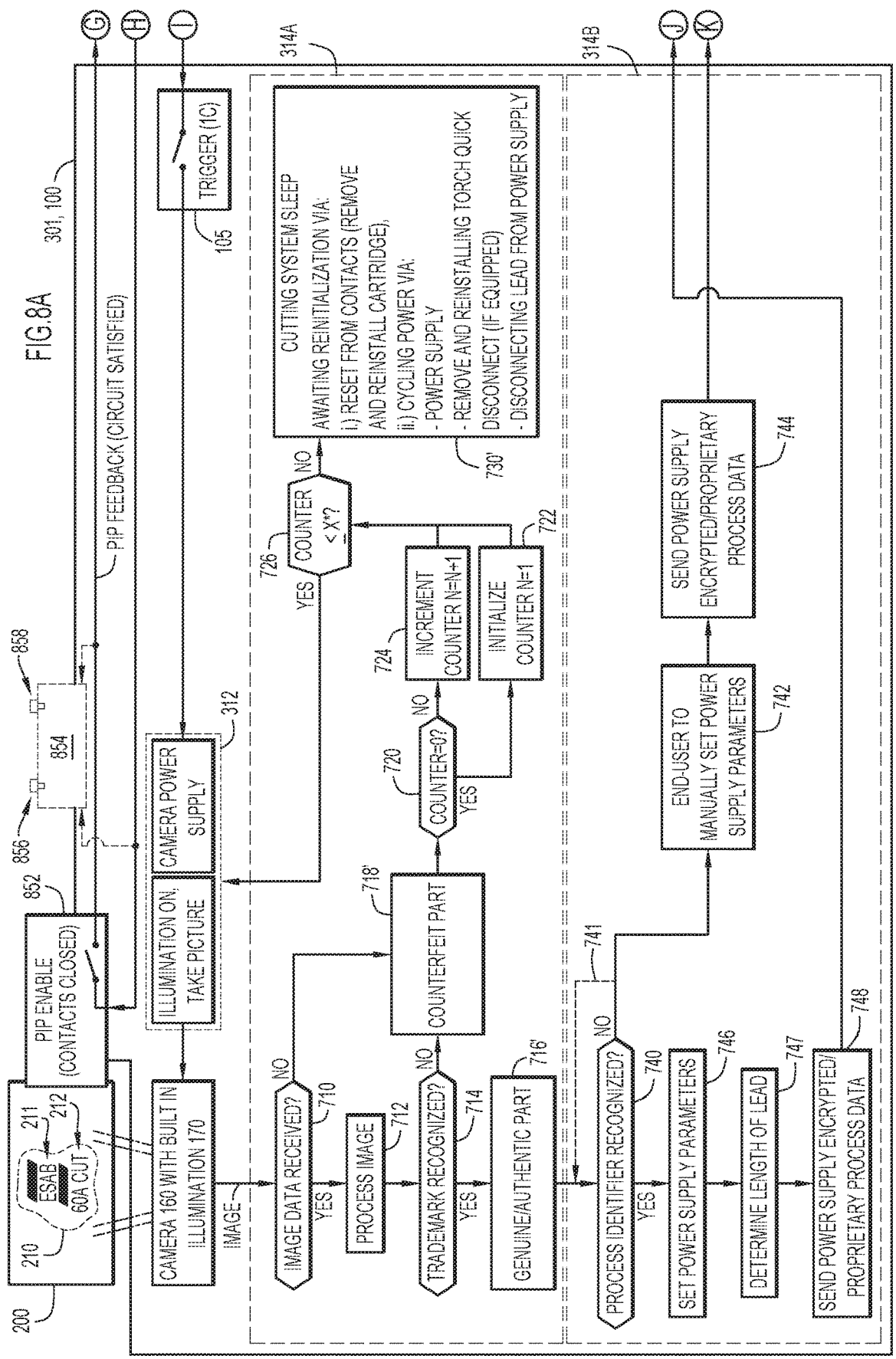

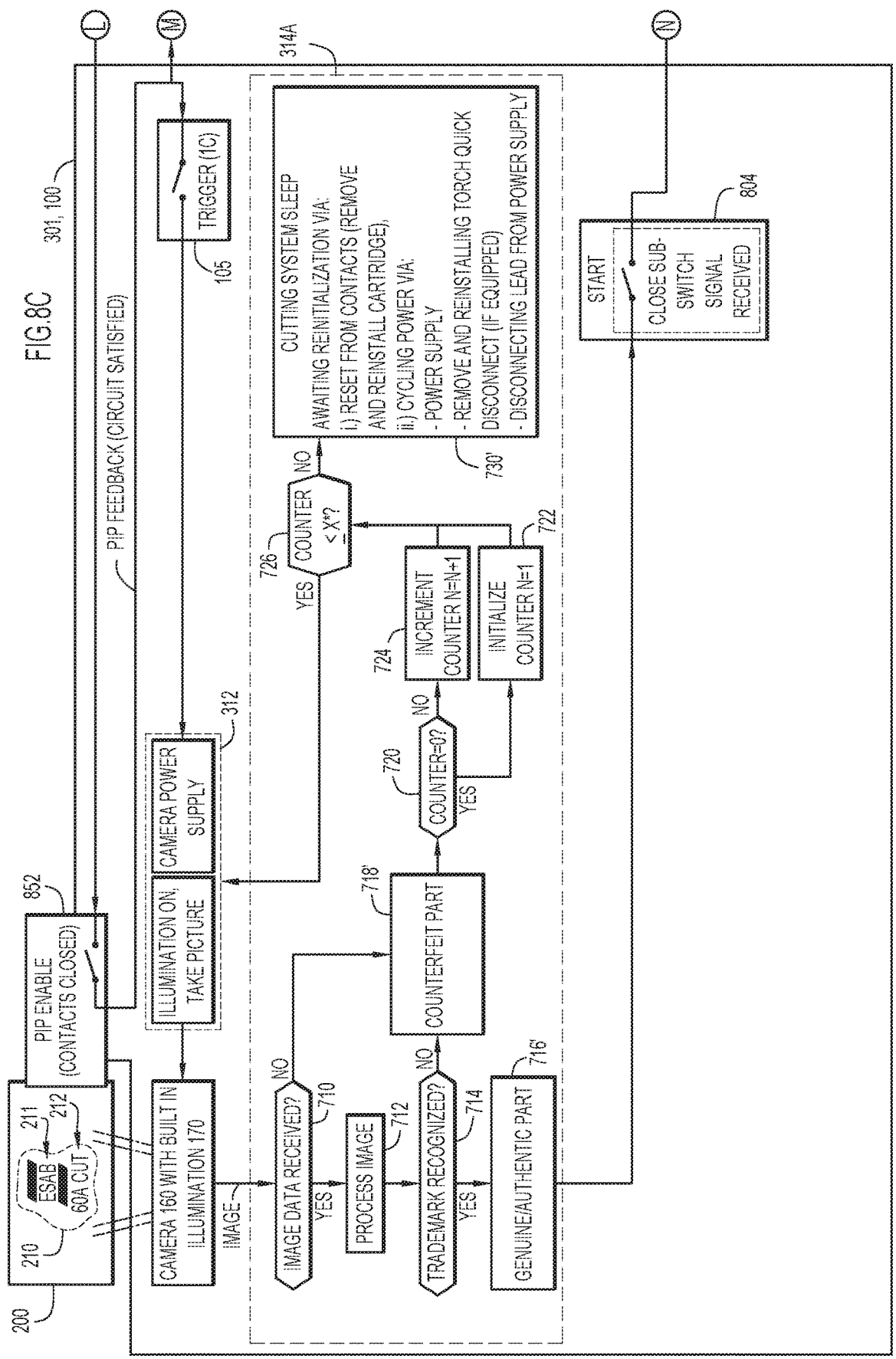

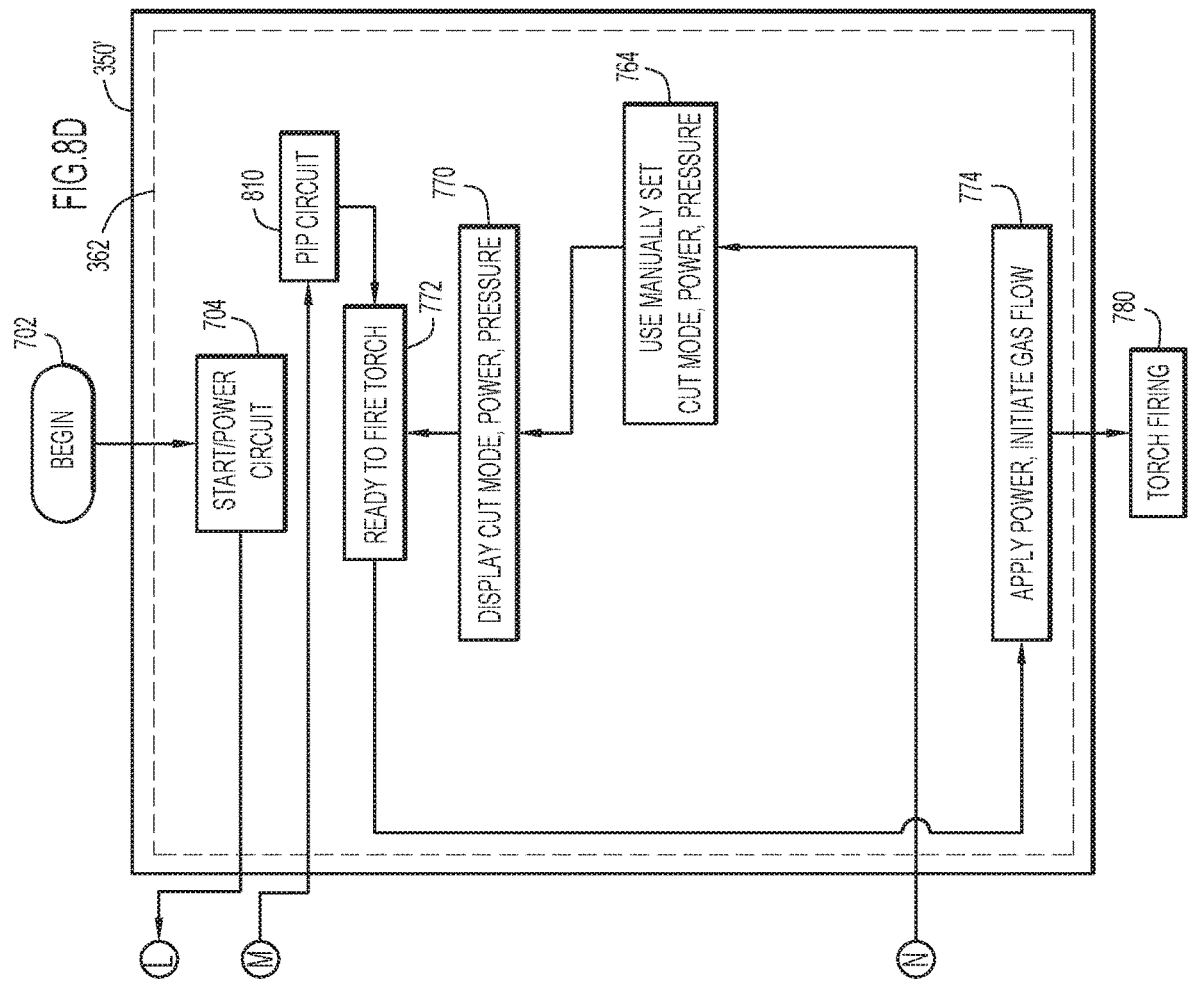

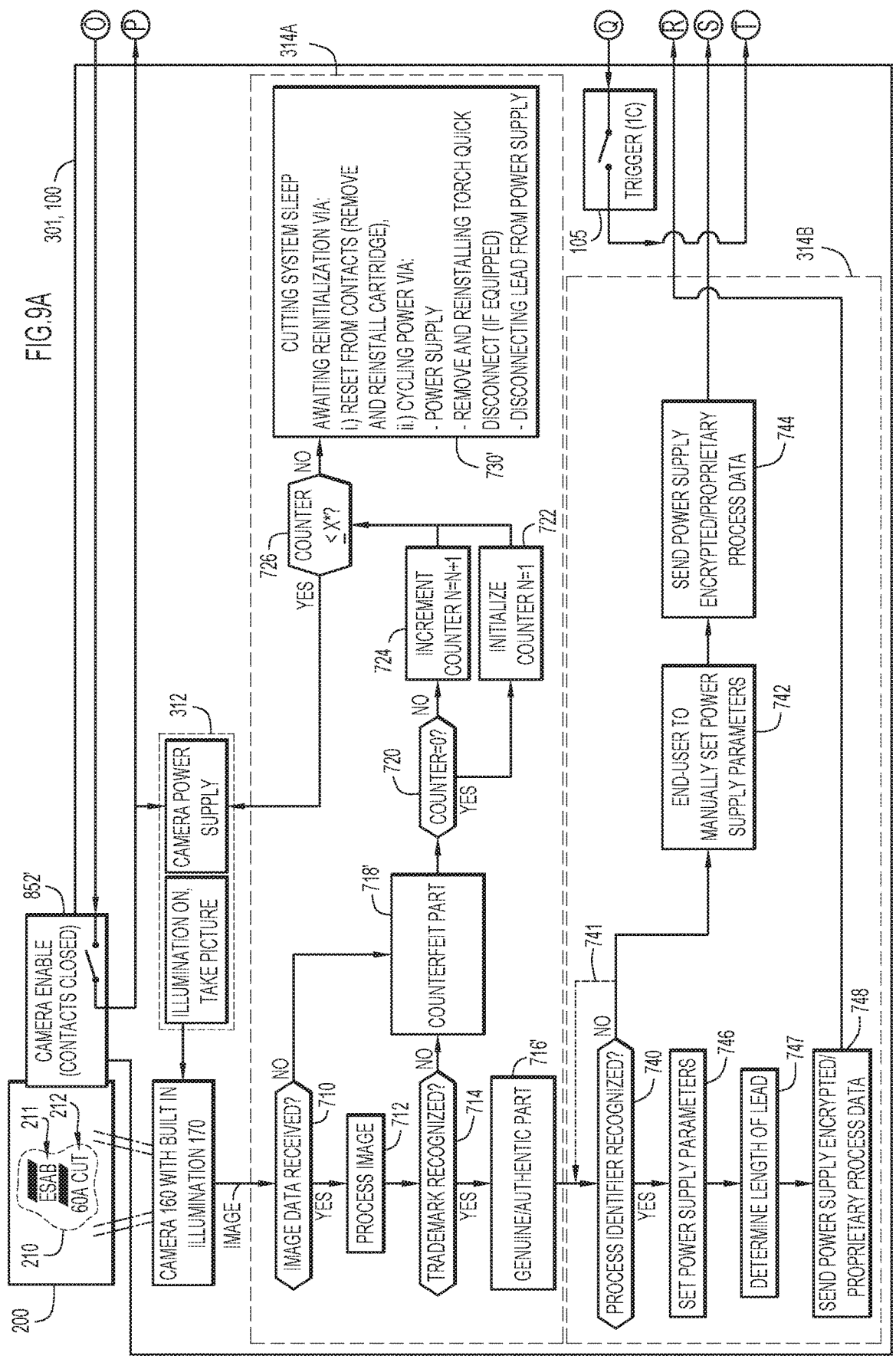

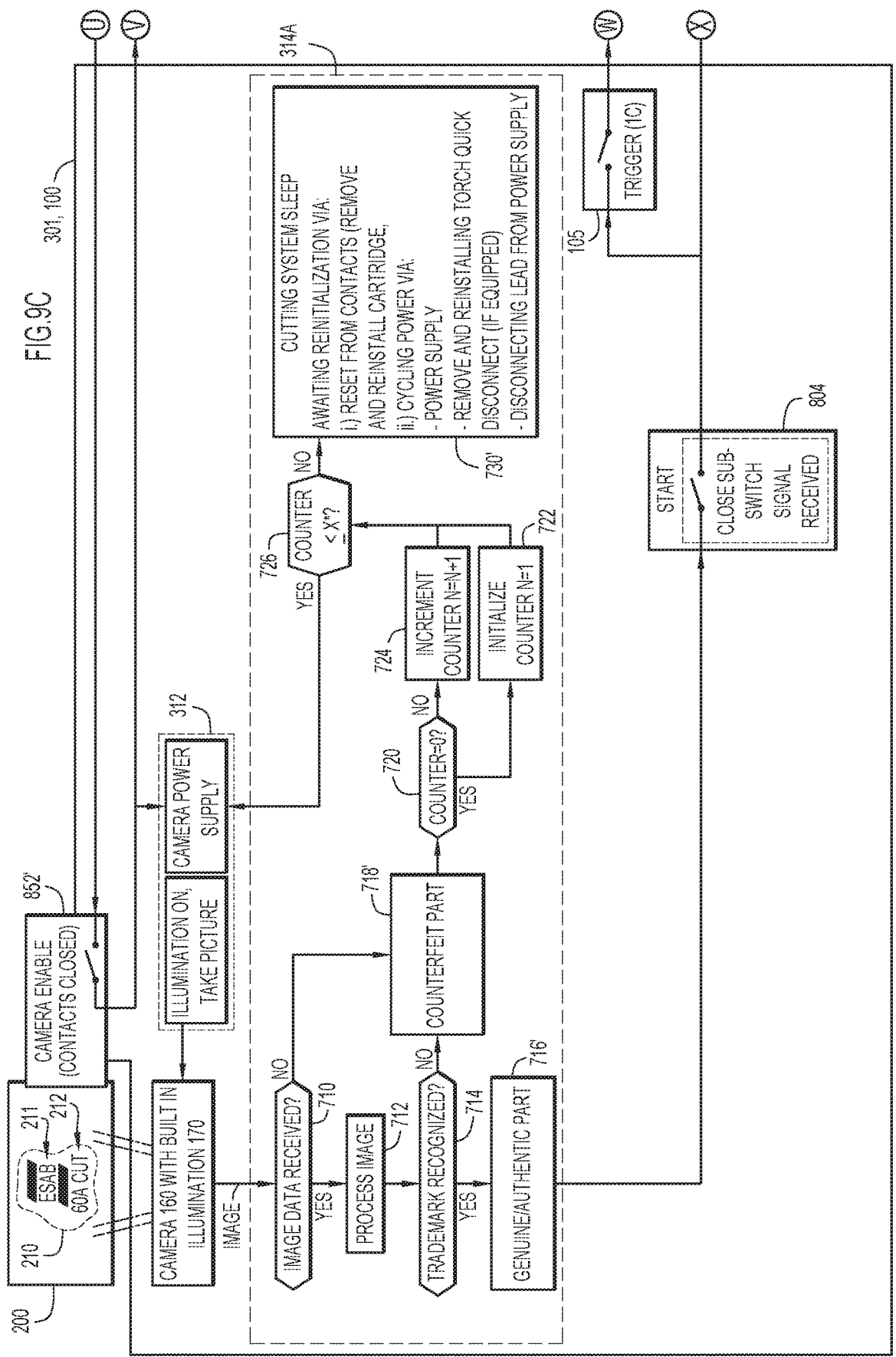

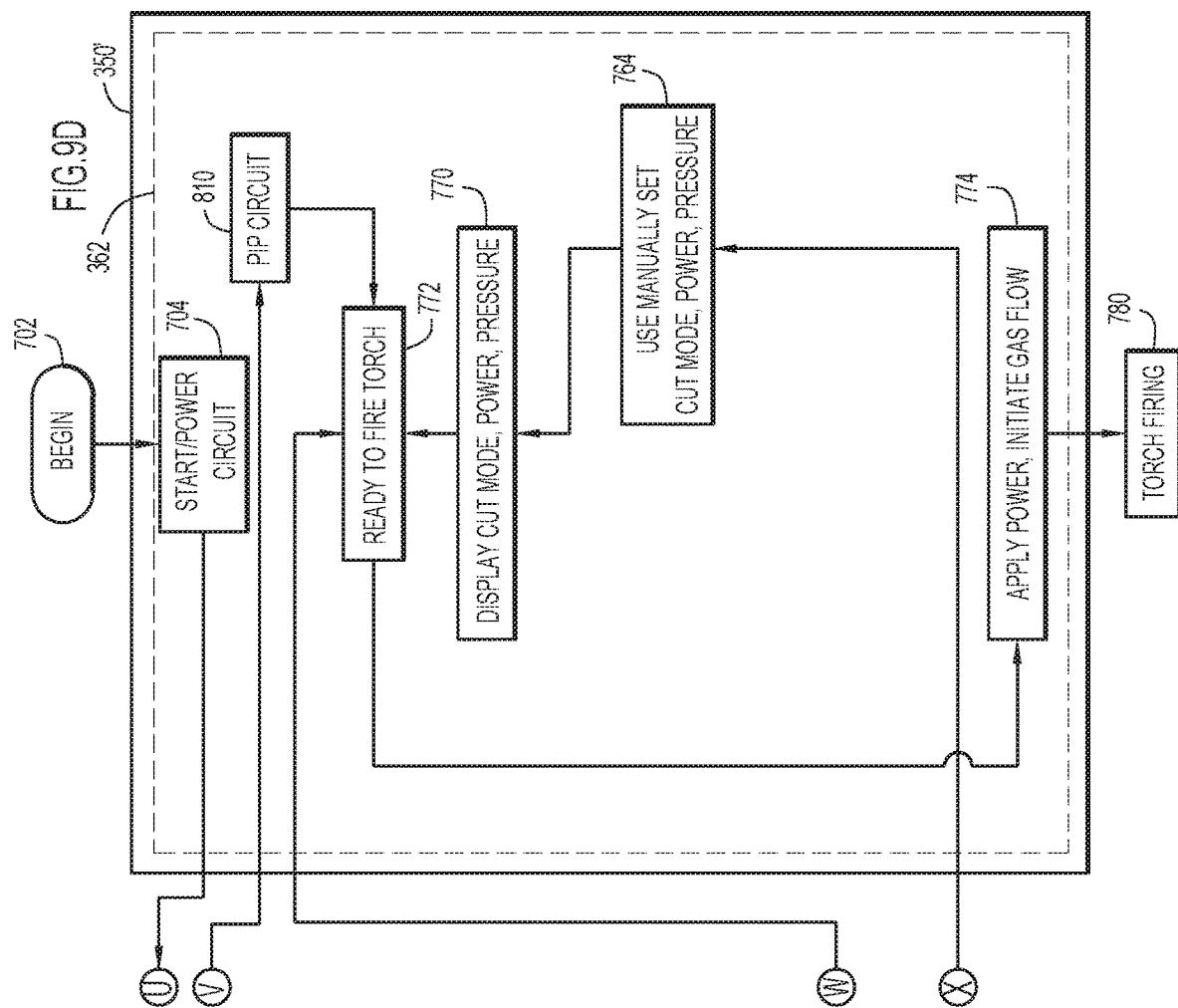

RECOGNITION OF COMPONENTS FOR WELDING AND CUTTING TORCHES

CROSS REFERENCE TO RELATED APPLICATIONS

This application is a continuation-in-part of U.S. patent application Ser. No. 16/448,903, filed Jun. 21, 2019, entitled "Automatic Identification of Components for Welding and Cutting Torches," which is a continuation-in-part of U.S. patent application Ser. No. 15/947,258, filed Apr. 6, 2018, entitled "Automatic Identification of Components for Welding and Cutting Torches," the entire disclosure of which are each incorporated herein by reference.

TECHNICAL FIELD

The present disclosure is directed toward recognizing components for welding and cutting torches and, in particular, to recognizing consumable components for welding and/or cutting torches.

BACKGROUND

Many welding and cutting torches, such as plasma cutting torches, now include torch bodies that can receive a variety of consumables (e.g., welding tips, cutting tips, and/or a variety of electrodes), as well as other interchangeable torch components. Consequently, a single torch body may be able to be used for a variety of cutting and/or welding operations (with different tips, electrodes, and/or other interchangeable/consumable components being installed for different operations). Unfortunately, different interchangeable torch components (e.g., different torch tips and different electrodes) often require different operational settings. Thus, different interchangeable torch components (e.g., torch tips and/or electrodes) must be identified and/or recognized before or during installation onto the torch body (or at least prior to a torch operating). Additionally, a power supply connected to the torch body usually needs to be adjusted when the torch is used with different components.

Often, different consumable torch components (e.g., torch tips, electrodes, etc.) are identified and/or recognized by an operator prior to installing a particular torch component on/in a torch body. For example, an operator may scan a bar code included on a component or on packaging for the component. Unfortunately, visual identification/recognition is often difficult (if not impossible), especially for inexperienced users, and bar code identification is only possible when the end user is carrying a bar code reader. It may also be difficult to identify/recognize counterfeit or otherwise unsuitable consumable components (e.g., competitor components with characteristics that are not suited to provide optimal welding/cutting parameters with a particular torch body, for example, because the parts include altered geometries) with visual or bar code identification.

Alternatively, some components may be identified using radio-frequency identification (RFID) techniques, pressure decay measurement techniques, and/or surface reflectivity measuring techniques. Unfortunately, RFID identification techniques may be expensive and may be incompatible with older parts unless the older parts are retrofitted with a RFID tag (rendering the technique even more expensive). Meanwhile, identifying components by measuring pressure decay or reflectivity may be unreliable and/or impractical for quickly identifying interchangeable torch components (e.g., torch tips and/or electrodes) as they are installed in a torch body. For example, pressure decay measurements may only be able to identify a component after a substantial amount of time and, moreover, measuring pressure decay for a consumable may be inaccurate if the consumable is worn. Meanwhile, measuring the reflectivity of a component may be unreliable since reflectively measurements may be inconsistent, especially for components of different shapes.

Regardless of how interchangeable torch components are identified, the power supply usually needs to be manually adjusted to appropriate settings before a torch with a newly installed component can be safely used. In some instances, a user must consult industry literature (i.e., manuals) or the component's packaging to determine the appropriate settings, which may become quite tedious or confusing, especially for an inexperienced user. If, instead, a user adjusts the settings based on memory or does not adjust the settings while switching between consumable components, the torch may become unsafe to operate. Additionally or alternatively, the torch may operate under non-ideal conditions, which may negatively impact cutting/welding performance of the torch and/or decrease part life, each of which may create inefficiencies in welding/cutting operations, in terms of both time and cost.

In view of the foregoing, it is desirable to quickly and automatically recognize a torch component installed on a torch (i.e., an electrode, torch tip, shield cup, gas distributor, or any other interchangeable/consumable part) with accuracy and reliability. Moreover, it is desirable to automatically adjust cutting or welding parameters, such as power parameters, flow parameters and/or fault conditions, based on the recognition. It is also desirable to provide an indication of any recognition or adjustment to a user, who may be separated from the power supply by a considerable distance.

SUMMARY

The present disclosure is directed towards recognizing components, such as consumable components, for welding and cutting torches. According to one embodiment, a torch assembly for welding or cutting operations includes a torch body and one or more imaging devices. The torch body has an operative end configured to removably receive one or more interchangeable torch components including one or more markings and defines an internal cavity. The one or more imaging devices are disposed within the internal cavity and are positioned to optically acquire an image or image data representative of the one or more markings included on the one or more interchangeable torch components so that the one or more interchangeable torch components can be optically recognized based on the one or more markings. Consequently, various components can be reliably and consistently identified and/or recognized with the techniques presented herein.

Moreover, the one or more markings (e.g., indicium or indicia) can be created with relatively inexpensive techniques, especially as compared to various other parts identification solutions, such as RFID tags; thus, older parts can be easily and inexpensively retrofitted to be suitable with the identification techniques presented herein. Still further, since the one or more markings can be or include a trademark, counterfeit or unsuitable parts can be easily identified (since counterfeit parts would not or, at least should not, include the trademark). This reduces safety risks and performance degradation associated with counterfeit and/or unsuitable parts. In at least some embodiments, the one or more markings are passive, mechanical markings.

In some embodiments, operational parameters of a torch including the component (e.g., power parameters of power supplied to the torch), are automatically adjusted in response to the automatic identifying/recognition. For example, the power supply may automatically adjust the current level supplied to the torch. Additionally or alternatively, the power supply may automatically adjust gas flow settings. Still further, an indication of operational parameters (e.g., current regulation) or a warning of unsafe conditions may be created at the power supply. Among other advantages, automatically adjusting operational parameters of the torch based on the automatic identifying/recognizing allows a user to seamlessly transition from one cutting or welding operation to another cutting or welding operation.

For example, a user may seamlessly transition from cutting at 40 Amps with a first plasma cutting tip to cutting at 80 Amps with a second plasma cutting tip simply by swapping out various consumable components. As another example, a user may seamlessly transition from marking to cutting to gouging, etc., by swapping out consumable components. Moreover, and also advantageously, automatic adjustment of operational parameters may prevent a user from inadvertently or undesirably increasing or decreasing certain operational settings based on the consumable components currently installed in the torch. For example, the power supply may restrict the current of the supplied power to a specific upper limit based on an identity of a component or identities of components currently installed in/on the torch. Preventing a user from undesirably altering certain operational settings may discourage or prevent unsafe welding/cutting operations while also discouraging or preventing a user from cutting or welding with suboptimal operational settings. In turn, these adjustments/restrictions may decrease costs associated with a cutting/welding operation (i.e., by preventing errors and/or shortening the duration of operations) and decrease costs associated with cutting/welding operations over time, such as maintenance or replacement part costs (i.e., by extending the life of the torch, power supply, and/or torch components).

Still further, if an operator has obtained counterfeit or otherwise unsuitable consumable components (e.g., components with characteristics that are not suited to provide optimal welding/cutting parameters with a particular torch body), the techniques presented herein may either prevent the operator from initiating operations with the torch (i.e., prevent arc transfer) or apply limits to the operational parameters of the torch. Limiting the operational parameters of the torch may protect the operator and/or the torch from dangers that might potentially be caused by failure of a counterfeit or unsuitable consumable component.

According to another embodiment, a system includes a torch assembly and a power supply. The torch includes a torch body with an operative end that receives an interchangeable torch component with one or more passive, mechanical markings, and an imaging device that is disposed on or within the torch body and optically acquires an image or image data representative of the one or more passive, mechanical markings included on the interchangeable torch component. The power supply automatically adjusts operational parameters of the torch based on the one or more passive, mechanical markings.

According to yet another embodiment, automatic identification of components is effectuated by a method that includes visually or optically acquiring an image of or image data representative (e.g., capturing images) of one or more passive markings included on or in one or more interchangeable torch components installed on or in a torch or torch assembly by operating one or more imaging devices disposed in or on the torch body. The one or more interchangeable torch components are identified based on the one or more passive markings.

According to still another embodiment, a torch assembly for welding or cutting operation includes a torch body, a memory, a processor, and an indicator assembly. The torch body includes an operative end configured to removably receive one or more interchangeable torch components The processor executes instructions stored in the memory so that the processor determines that the one or more interchangeable torch components are genuine and determines operational parameters for the one or more interchangeable torch components. The indicator assembly provides a first indication when the one or more interchangeable torch components are determined to be genuine and provides a second indication when the operational parameters are to be implemented.

According to another embodiment, a system includes a torch assembly and a unitary cartridge. The torch assembly includes a torch body with an operative end, an indicator assembly, a memory, and a processor that executes instructions stored in the memory. The unitary cartridge is removably coupleable to the operative end of the torch body. The processor determines that the unitary cartridge is genuine, causes the indicator assembly to provide a first indication based on a determination that the unitary cartridge is genuine, and sends a start signal to a power supply based on the determination that the unitary cartridge is genuine, the start signal causing the power supply to deliver power and gas to the torch assembly.

According to still another embodiment, a method includes determining that one or more interchangeable torch components installed in an operative end of a torch are genuine. Operational parameters for the one or more interchangeable torch components may also be determined. Then, an indicator assembly can be activated to provide a first indication when the one or more interchangeable torch components are determined to be genuine and can be activated to provide a second indication when the operational parameters are implemented at a power supply connected to the torch.

BRIEF DESCRIPTION OF THE SEVERAL VIEWS OF THE DRAWINGS

FIG. 1C is a sectional view of an end of the torch assembly of FIG. 1B that is configured to receive and automatically recognize interchangeable torch components, according to an example embodiment of the present disclosure.

FIGS. 7A-D, 8A-D, and 9A-D are block diagrams depicting power, data, and logic flows according to example embodiments of the present disclosure.

Like numerals identify like components throughout the figures.

DETAILED DESCRIPTION

Figure 1A:
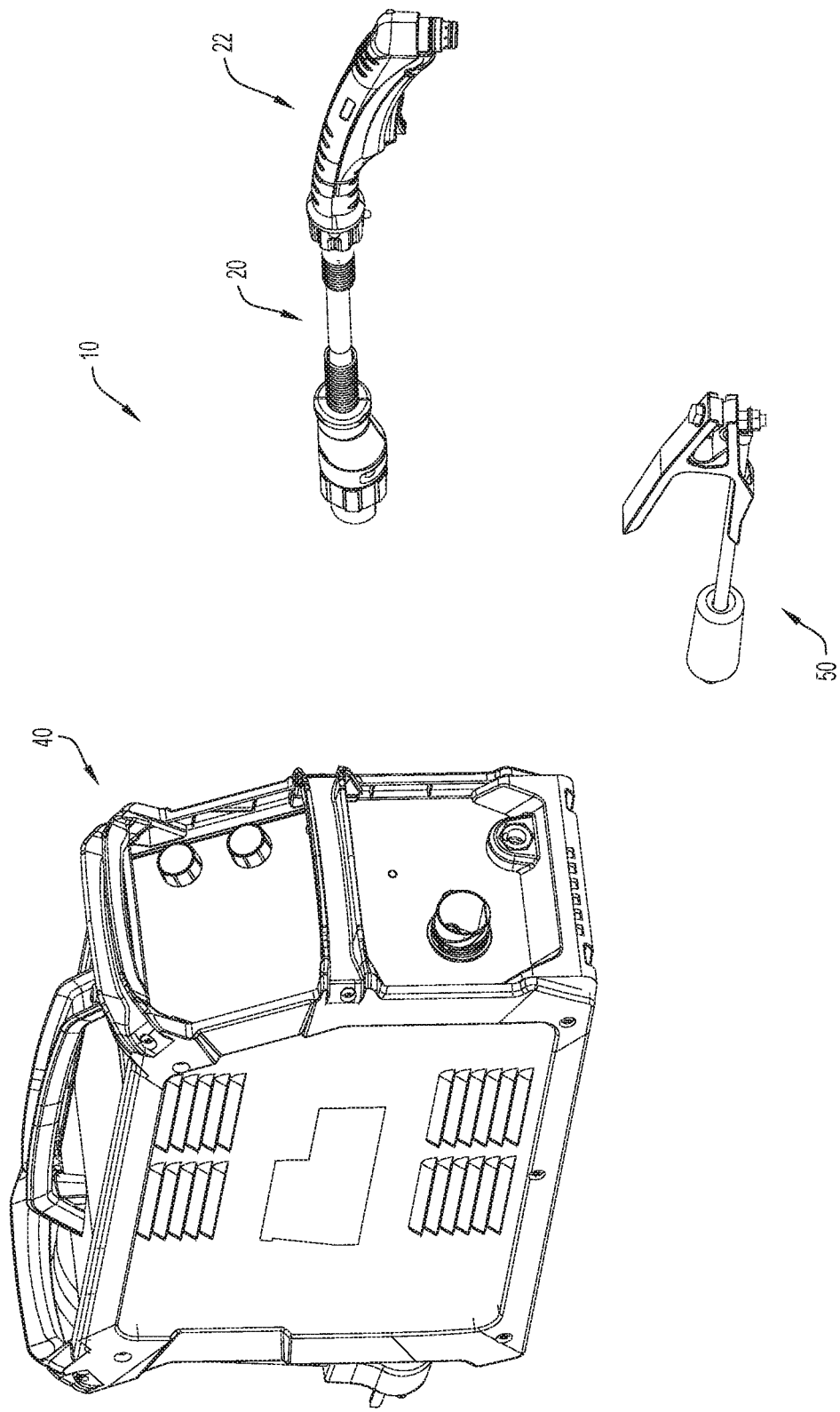
FIG. 1A is a perspective view of a cutting system including a power supply and torch assembly configured to automatically recognize interchangeable torch components and automatically adjust operational settings of the torch assembly, according to an example embodiment of the present disclosure.

A method, apparatus, and system for automatically identifying and/or recognizing interchangeable torch components, such as electrodes, torch tips and other consumables, for welding and/or cutting torch assemblies (referred to herein simply as torch assemblies) are presented herein. The method, apparatus, and system identify and/or recognize interchangeable torch components with optical recognition techniques that identify one or more markings (e.g., one or more passive, mechanical markings) included on interchangeable torch components. For example, an imaging device, such as a camera, may be included in or on the torch assembly and the imaging device may be positioned to optically acquire an image of and/or image data representative of a surface (e.g., a back surface) of one or more consumable components or an assembly of components (e.g. a serviceable and/or nonserviceable cartridge comprised of said components) installed onto/into the torch of the torch assembly. As two specific examples, a camera may acquire (e.g., capture) an image of a marking or a laser scanner may acquire image data representative of a marking.

Regardless of how images and/or image data are acquired, optical recognition techniques (e.g., optical character recognition (OCR) techniques) may be applied to the acquired image and/or image data to recognize one or more markings included in the image and/or image data. In some embodiments, the one or more markings included on the interchangeable torch components may include a manufacturer's trademark (e.g., ESAB) which allows the components to be recognized as genuine components (i.e., not counterfeit). Additionally or alternatively, the one or more markings may include an indication of the operation(s) for which the component is intended (e.g., "60A CUT").

As is explained in further detail below, in at least some embodiments, a power supply coupled to a torch receiving interchangeable torch components may automatically adjust or control operational parameters of the torch when one or more of the interchangeable torch components included/installed in the torch are identified and/or recognized. For example, in some embodiments, the torch may be configured to emit light towards a surface of a torch component including one or more markings, optically acquire an image of and/or image data representative of the one or more markings, and transmit the image to a power supply. The power supply may then identify and/or recognize the component and automatically adjust power and gas transfer settings accordingly. The delegation of operations in this specific example may make the techniques presented herein relatively easy to retrofit into existing torches. The delegation of operations may also, in some embodiments, reduce the amount of processing (and number of components) required in the torch which may make the torch easier to service, lighter (at least incrementally), and/or easier to operate. Moreover, identifying the component at the power supply may allow the power supply to quickly adjust the parameters of power and/or gas being delivered to the torch based on the components installed in the torch, which may ensure that the torch cannot operate with unsafe or undesirable power parameters (i.e., undesirable for welding/cutting performance and/or for the longevity of the torch and/or the identified interchangeable torch components). That all being said, in other embodiments, a torch may include any necessary components therein so that interchangeable torch components can be identified and/or recognized at the torch (and instructions can be sent to the power supply in view of the same), as is also explained in further detail below.

FIG. 1A illustrates an example embodiment of cutting system 10 that may implement the techniques presented herein. At a high-level, the cutting system 10 include a power supply 40 that is configured to supply (or at least control the supply of) power and gas to a torch assembly 20 that includes a torch 22. As is described in further detail below, the power supply 40 supplies gas and/or power to the torch assembly 20 based on an identity of interchangeable components installed in the torch assembly 20. The cutting system 10 also includes a working lead 50 with a grounding clamp. Although lead 50 and the lead 32 included in the torch assembly 20 (see FIG. 1B) are illustrated as being relatively short, the leads may be any length. Moreover, although not shown, a welding system configured to implement the techniques presented herein may include similar components.

Figure 1B:
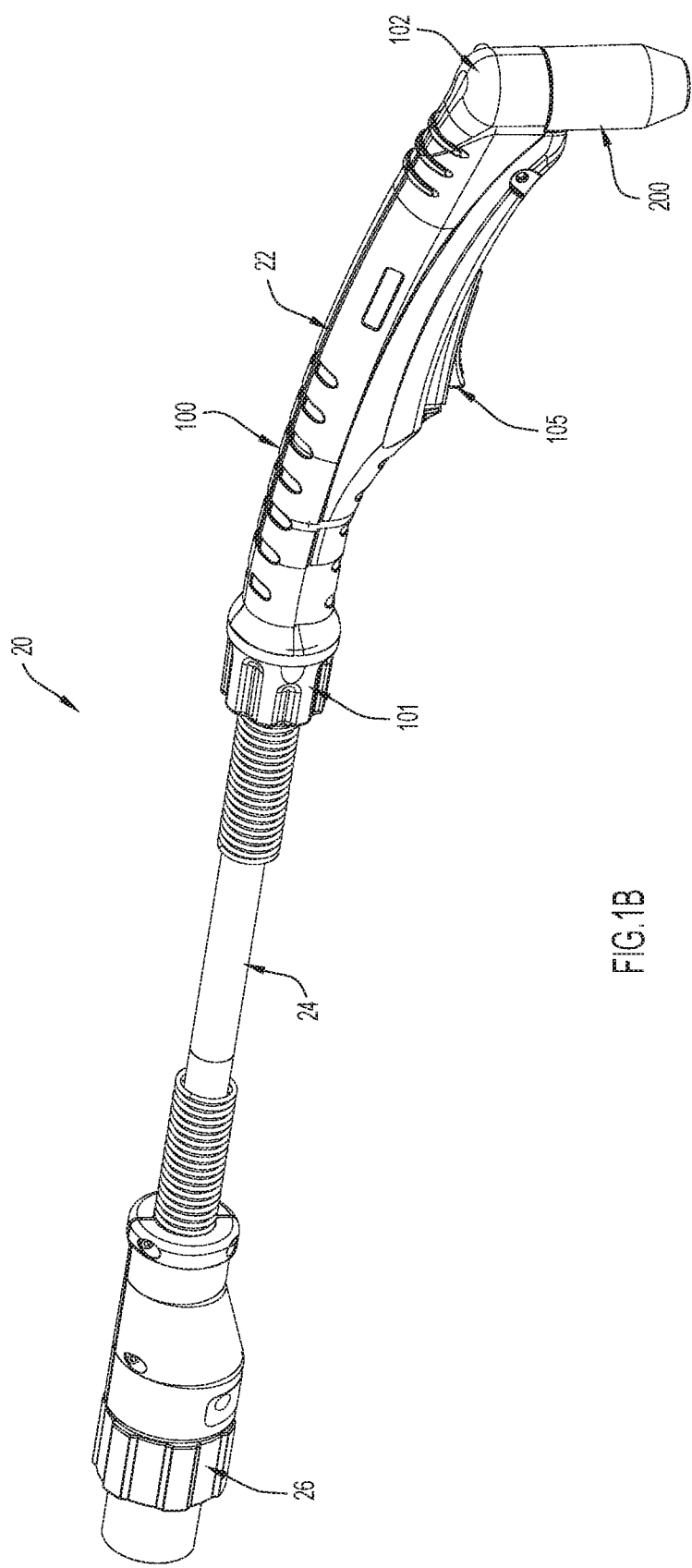
FIG. 1B is a perspective view of the torch assembly of FIG. 1A, according to an example embodiment of the present disclosure.

FIG. 1B illustrates the torch assembly 20 shown in FIG. 1A from an external perspective. As can be seen, the torch assembly 20 includes a torch 22 with a torch body 100 that extends from a first end 101 (e.g., a connection end 101) to a second end 102 (e.g., an operating or operative end 102). The connection end 101 of the torch body 100 may be coupled (in any manner now known or developed hereafter) to one end of lead 24 and the other end of lead 24 may be coupled to or include a connector 26 that allows the torch assembly 20 to be coupled to the power supply 40 in any manner now known or developed hereafter (e.g., a releasable connection). Meanwhile, the operative end 102 of the torch body may receive interchangeable components, such as consumable components, which are generally denoted by item 200, but may include a variety of components, such as torch tips, electrodes, gas rings, etc., as is discussed in further detail below. The body 100 may also include a trigger 105 that allows a user to initiate cutting operations.

FIG. 1C illustrates a portion of torch 22 that is proximate the operative end 102 of the torch body 100. For simplicity, FIG. 1C illustrates the torch body 100 without various components or parts, such as power or gas transfer components, that are typically included in a welding/cutting torch. Instead, FIG. 1C illustrates only select components or parts that allow for a clear and concise illustration of the techniques presented herein. However, it is to be understood that any unillustrated components that are typically included in a torch (i.e., components to facilitate welding or cutting operations) may (and, in fact, should) be included in a torch configured in accordance with an example embodiment of the present invention.

In the depicted embodiment, the torch body 100 receives an interchangeable electrode 120, an interchangeable gas distributor 130, an interchangeable torch tip 140, and an interchangeable shield cup 150, insofar as each of these components may be interchangeable for other like components and is not necessarily interchangeable or reconfigurable in and of itself. For example, the electrode 120 is interchangeable because it may be swapped for or replaced with another electrode (or another, similar consumable). In the depicted embodiment, the gas distributor 130 and the electrode 120 can be installed onto the torch body 100 and the tip 140 can be installed there over. Alternatively, the electrode 120, the gas distributor 130, and the tip 140 can be installed onto the torch body 100 as a single component (e.g., as a cartridge). Either way, once the electrode 120, the gas distributor 130, and the tip 140 and are installed onto/into the torch body 100, the shield cup 150 secures these consumables to the operative end 102 of the torch body 100. For example, the shield cup 150 may be installed around an installation flange 142 of the torch tip 140 in order to secure the electrode 120, the gas distributor 130, and the torch tip 140 in place at (and in axial alignment with) an operative end 102 of the torch body 100. Alternatively, the shield cup 150 could be part of a cartridge that includes the electrode 120, the gas distributor 130, and the tip 140 and could include mating features that secure the cartridge to the operative end 102 of the torch body 100 in a proper or suitable alignment with the torch body 100.

However, in other embodiments, the electrode 120, gas distributor 130, and/or torch tip 140 (as well as any other interchangeable torch components) can be secured or affixed to the torch body 100 in any desirable manner, such as by mating threaded sections included on the torch body 100 with corresponding threads included on the components. Moreover, in other embodiments, the torch assembly 20 (or just the torch 22) may include any suitable combination of interchangeable torch components, in addition to or in lieu of the interchangeable electrode 120, the interchangeable gas distributor 130, the interchangeable torch tip 140, and/or the interchangeable shield cup 150.

Still referring to FIG. 1C, the torch assembly 20 also includes an imaging device 160 that, in the depicted embodiment, is disposed within the torch body 100. More specifically, the torch body 100 defines an internal cavity 104 and the imaging device 160 is positioned within the internal cavity 104 so that the imaging device 160 can optically acquire one or more images of and/or image data representative of the operative end 102 of the torch body 100. That is, the imaging device 160 is positioned to optically acquire one or more images of and/or image data representative of interchangeable torch components installed on the operative end 102 of the torch body 100. In some embodiments, the imaging device 160 need not have a direct line of sight to the operative end 102 and, instead, may view the operative end 102 of the internal cavity 104 via any optics components, such as mirrors, fiber optics, light pipes, etc. now known or developed hereafter. Put another way, the imaging device 160 may be optically coupled to the operative end 102 of the internal cavity 104 via any optics components now known or developed hereafter. In fact, in some embodiments, the imaging device 160 need not be disposed within the torch assembly 20 and can be disposed on or near an outer surface of the torch body 100 and optically coupled to the operative end 102 of the internal cavity 104. That being said, embodiments with an internal imaging device 160 (i.e., an imaging device 160 disposed within internal cavity 104) may be sleeker, more efficient, and less likely to malfunction than embodiments including an imaging device coupled to an exterior surface of the torch body 100 or otherwise disposed externally of the torch assembly 20 (e.g., an "external imaging device 160").

Generally, the imaging device 160 may be any device or component capable of optically acquiring two-dimensional and/or three-dimensional images and/or image data representative of an image. For example, the imaging device 160 may be a single camera that captures two-dimensional images of any surfaces (and one or more markings included thereon) in its field of view. Additionally or alternatively, the imaging device 160 may include multiple imaging components, such as an array of cameras, multiple cameras, lasers, LIDAR, ultrasound, sonar, radar, infrared imaging device, etc., that allow the imaging device 160 to acquire two-dimensional images, three-dimensional images (e.g., to detect etchings, as is described in further detail below), and/or image data (e.g., data from an optical scan with a laser that is representative of an image).

As is illustrated in FIG. 1C, in some embodiments the imaging device 160 may have a field of view "A" that spans only a portion (e.g., half) of the operative end 102 of the torch body 100, but, in other embodiments, the imaging device 160 may have a field of view that spans the entire torch body 100 ("A"+"B"). As is explained in further detail below, in some embodiments, the interchangeable torch components (e.g., consumable components) may be keyed to align any markings with a certain radial location of the torch body (e.g., a "top" of the torch body). In these embodiments, it may only be necessary for the imaging device 160 to have a field of view "A" that covers the radial location (e.g., only have a field of view that covers a segment of the cylindrically-shaped torch body 100).

Moreover, in some embodiments, the various components may include pathways, openings, or other such features (e.g., embedded fiber optics) to expand the field of view of an imaging device 160 beyond the components that are immediately adjacent to the imaging device 160. For example, in FIG. 1C the imaging device 160 has a direct line of sight to a back surface 122 of the electrode 120 and a back surface 132 of the gas distributor 130, but the imaging device 160 may not have a direct line of sight to a back surface 144 of the torch tip 140. Thus, the gas distributor 130 defines a pathway 134 (e.g., a fiber optics pathway) that provides the imaging device 160 with a line of sight to a specific portion of the back surface 144 of the torch tip. Consequently, in the depicted embodiment, the imaging device is positioned to optically acquire one or more images of and/or image data representative of the back surface 122 of the electrode 120, the back surface 132 of the gas distributor 130, and the back surface 144 of the torch tip 140, regardless of whether the imaging device 160 has a field of vision defined by "A" or defined by "A"+"B."

In some embodiments, the torch assembly 20 may also include a light source 170 configured to illuminate a field of view (e.g., "A" or "A"+"B") of the imaging device 160. That is, if the imaging device 160 has a field of view "A," the light source 170 may illuminate at least the field of view "A", as is illustrated by "A1," and if the imaging device 160 has a field of view "A+B," the light source 170 may illuminate at least the field of view "A+B", as is illustrated by "A1+B1." The light source 170 may be any device that can illuminate surfaces of interchangeable torch components in a particular field of view, such as a light-emitting diode (LED). Additionally or alternatively, light emitted during operations of the torch (i.e., light emitted by a plasma arc) may supplement or replace light from the light source 170 included in or on the torch body 100 and, thus, the welding/cutting operations may also be referred to as the light source 170. If the torch assembly 20 includes a light source 170, the light source may be positioned within the internal cavity 104 of the torch body 100 or externally of the internal cavity 104 and may have a direct line of sight to interchangeable components or be optically coupled to the operable end of the internal cavity 104 via any optics components, such as mirrors, fiber optics, light pipes, etc. now known or developed hereafter.

Although FIG. 1C illustrates a single imaging device 160 and a single light source 170, in some embodiments, the torch 20 may include multiple imaging devices 160. The different imaging devices 160 may each be dedicated to a specific type of interchangeable torch component 200 (e.g., a first imaging device for electrodes, a second imaging device for torch tips, etc.) or to different combinations of consumables. In other embodiments, a single imaging device 160 may be suitable for imaging one or more markings 210 (see FIG. 2A) included on any components 200 installed onto the torch body 100 (i.e., coupled to the torch body 100). Embodiments including multiple imaging devices 160 may also include multiple light sources 170. The light sources 170 may each be dedicated to a single imaging device 160, a set of imaging devices 160, or some combination thereof. Alternatively, a single light source 170 might provide light for any imaging devices 160 included in a torch 20.

Still referring to FIG. 1C, the torch assembly 20 also includes a processor 190. The processor 190 included in the torch body 100 may operate any combination of imaging devices 160 and light sources 170. Moreover, as is described in further detail below, the processor 190 may identify and/or recognize the components based on their one or more markings or transmit data to the power supply that allows the power supply to identify and/or recognize the components based on their one or more markings. Thus, regardless of how the interchangeable electrode 120, the interchangeable gas distributor 130, the interchangeable torch tip 140, and/or the interchangeable shield cup 150 are attached to the operative end 102 of the torch body 100, if any of these interchangeable torch components (as well as any other interchangeable torch component included in or on the torch body 100) includes one or more markings 210 (see FIG. 2A), the component can be identified and/or recognized based on one or more images of and/or image data representative of the one or more markings 210 acquired by the imaging device 160 (with the acquisition of images and/or image data potentially facilitated by illumination from light source 170).

Figure 2A:
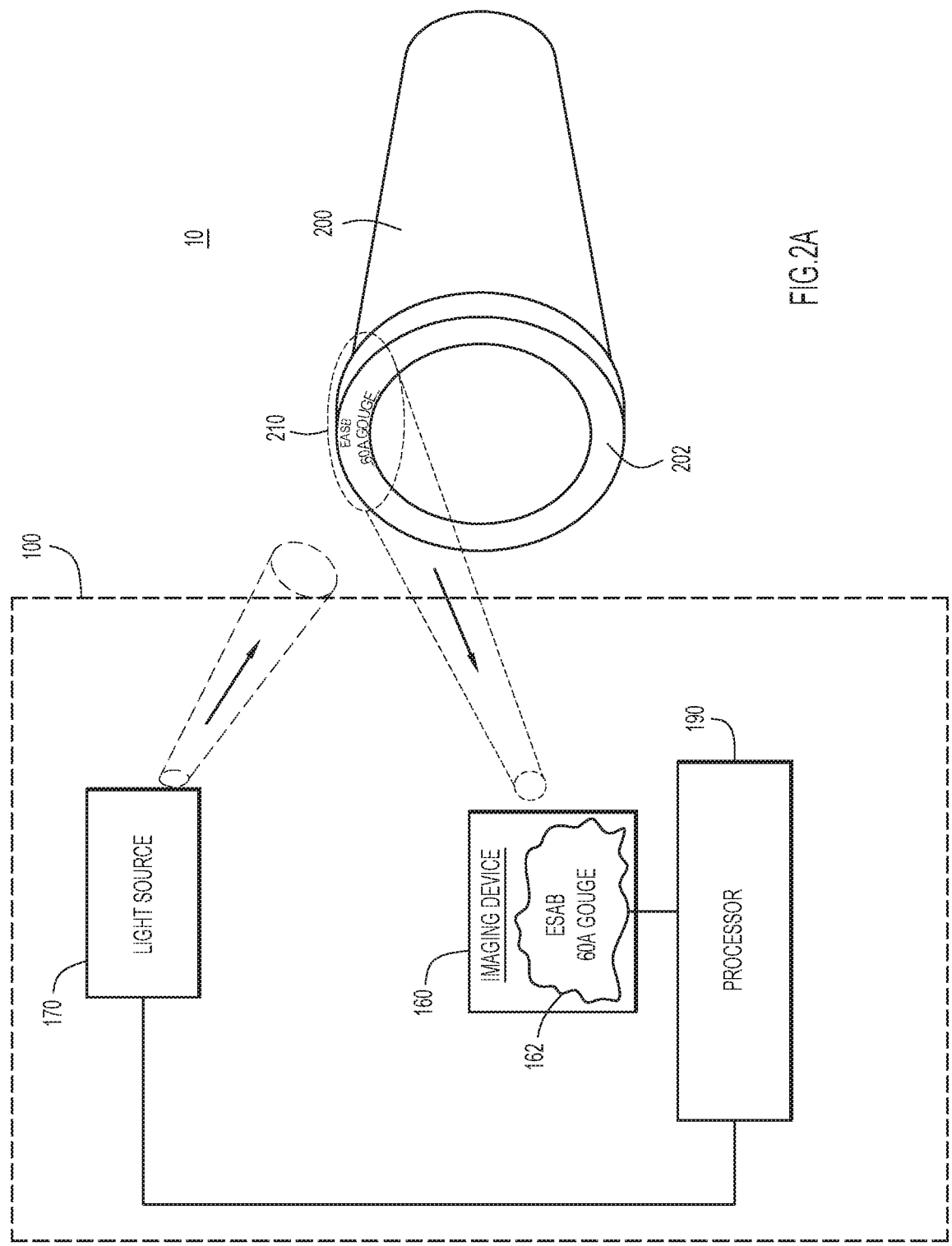
FIG. 2A is a block diagram representation of a portion of the torch illustrated in FIGS. 1A-1C and an interchangeable torch component, according to an example embodiment.

FIG. 2A provides a block diagram representation of the torch of FIG. 1C. Consequently, like parts from FIG. 1C are labeled with the same part numbers in FIG. 2A (and the description of these parts included above may be applicable to the like parts shown in FIG. 2A). For example, the description of torch body 100 included above may be applicable to the torch body 100 depicted in FIG. 2A and, thus, the torch body 100 can receive an interchangeable consumable component 200 (which may be representative of electrode 120, gas distributor 130, torch tip 140, or shield cup 150) with one or more markings 210. For simplicity, the markings 210 may also be referred to herein as indicia 210, with the understanding that the term "indicia" may refer to one or more markings despite indicia being plural. In FIG. 2A, the indicia 210 are included on a back surface 202 of the component 200; however, it is to be understood that this location is merely an example. In other embodiments, any interchangeable torch component 200 that is installable onto the torch body 100 (including interchangeable torch components shown in FIG. 1C as well as any other interchangeable torch components that are not shown in FIG. 1C, such as various consumables) may include indicia 210 on any location that is viewable by the imaging device 160 (either directly or via optics components).

Generally, an interchangeable torch component 200 can be manufactured with indicia 210 included thereon or the indicia 210 can be added to a surface of the component in any manner now known or developed hereafter. For example, indicia 210 may be permanently added to an interchangeable torch component (e.g., a consumable) by permanently marking the torch component with characters and/or symbols (e.g., with a laser, etching, printing, stamping, etc.). Alternatively, indicia may be permanently or temporarily added to an interchangeable torch component (e.g., a consumable) with a label, sticker, or other such item/method. The characters and/or symbols of indicia 210 correspond to the component's manufacturer and application (e.g., purpose, usage, and characteristics). For example, in FIG. 2A, interchangeable component 200 (which is representative of at least electrode 120, gas distributor 130, torch tip 140, and/or shield cup 150) includes indicia 210 that reads "ESAB 60A GOUGE." This indicates that the part was manufactured by ESAB (and, thus, may be suitable for an ESAB torch body) and is suitable for plasma gouging with 60 Amps. However, despite this example, the characters and/or symbols included in indicia 210 need not be human-readable (markings that are not human-readable may be referred to herein as machine-readable), provided that the imaging device 160 can optically acquire one or more images of and/or image data representative of the indicia 210 (even if the acquisition requires illumination from a light source 170) and that optical recognition techniques can be applied to the characters, symbols, or any other identifier/indicia.

The indicia 210 need not be two-dimensional and, instead, the indicia 210 may be or include three-dimensional features. For example, the indicia 210 may include a raised or carved portion. Three-dimensional features can be scanned for symbols and characters as well as profile and depth (e.g., with a laser, sonar, radar, etc.) and the profile and depth may be considered when the indicia are processed with optical recognition techniques. However, the indicia are passive, mechanical indicia, insofar as "passive" indicates that the indicia do not emit any signals, store or transmit any electronic data, or otherwise perform any actions. Put another way, the indicia/markings are dumb (as opposed to being smart indicia that might interact with a computing device). Meanwhile, "mechanical" indicates that the markings/indicia are physical markings formed or created from physical additive or subtractive processes applied to an interchangeable component. As some examples, the mechanical markings may include holes formed with drills, letters etched into a material, symbols printed onto a material, shapes etched onto a material, etc. In at least some embodiments, the markings are also non-functional insofar as the markings do provide an attachment point, a cooling feature, and/or some other functional aspect of an interchangeable component and, instead, are provided on the interchangeable component in addition to functional features.

Irrespective of the physical characteristics of the indicia (e.g., irrespective of whether the indicia are two-dimensional or three-dimensional, include holes or etched shapes, etc.), the indicia 210 (e.g., the one or more markings) are included on a portion of an interchangeable component 200 that will be within a field of view of the one or more imaging devices included in the torch assembly (e.g., field of view A from FIG. 1C). That is, the indicia 210 are provided in a location that is optically viewable from a position interior of the operative end 102 of the torch 22 (see FIG. 1C). For example, in at least some embodiments, the indicia 210 may be included at a radially exterior position on a rear surface (e.g., an end wall, as opposed to a side wall) of a consumable component. In at least some embodiments, this position is unobstructed (e.g., uncovered or not blocked by other components) and, thus, is optically viewable by the one or more imaging devices 160 included in the torch assembly.

By comparison, typically interchangeable components (e.g., consumable components) include branding information (or other such markings) on a larger surface (e.g., a side wall) of the component, where it is easier to include the branding information (e.g., since there is more surface area available to include the information). Additionally, typically, interchangeable components (e.g., consumable components) include mechanical mating features (e.g., threading, coolant passages/connections, etc.) at a rear end wall and, thus, it is difficult to include a marking on a rear end wall (or other such optically viewable portions of the component). Here, the one or more interchangeable components are marked on an optically viewable surface to ensure that one or more imaging devices included in the torch assembly can acquire an image and/or image data of the one or more markings included on the one or more interchangeable components. For example, in FIG. 1C, electrode 120 may include one or more markings on its rear surface 122, which may be an optically viewable surface, insofar as the surface may be viewable from the operative end 102 of the torch body 100 (of the torch 22).

Also irrespective of the physical characteristics of the indicia, in at least some embodiments, the component 200 includes features that align the indicia 210 with a specific portion of the torch body 100. In these embodiments, the alignment ensures that the indicia 210 are viewable by the imaging device 160 included in the torch body 100. For example, the component 200 and the torch body 100 may include markings (or any other type of mechanical keying) that indicate how to align the component 200 with the torch body 100 during installation of the component 200 onto the torch body 100 to ensure the indicia 210 will be optically aligned with the imaging device 160.

Moreover, although FIG. 2A illustrates only a single component 200 with indicia 210, one or more interchangeable torch components 200 may be installed onto a torch body 100 and the torch 20 may be configured to detect each of these components 200. In some embodiments, multiple components may be associated with a single marking or set of markings 210 (e.g., if multiple components are combined in a cartridge) and the one or more markings 210 may be specific to the combination of components. For example, multiple components could include a portion of an overall indicia pattern and the overall indicia pattern might be complete only when all of the components are connected to each other. As another example, a cartridge body might include one or more markings and might be configured to receive only specific consumable components (and the one or more markings might represent all of the components in the cartridge body). Alternatively, multiple components may each include their own indicia 210. In embodiments where various components include their own indicia 210, indicia 210 may be compared across components to determine cross-component compatibility. As mentioned, in some embodiments, the torch 20 may include multiple imaging devices, each dedicated to at least one specific type of interchangeable torch component 200 (e.g., a first imaging device for electrodes, a second imaging device for torch tips, etc.), but in other embodiments, a single imaging device 160 may be suitable for imaging indicia 210 included on any components 200 installed onto the torch body 100.

As was mentioned above (and is explained in detail below), the processor 190 may be configured to process an image 162 (or image data) acquired by the imaging device 160 (as opposed to simply being configured to operate one or more imaging devices 160 and one or more light sources 170). For example, in FIG. 2A, the processor may apply OCR techniques to image 162 (which includes characters that provide "ESAB 60A GOUGE."). However, in various embodiments, any optical recognition techniques now known or developed hereafter may be applied to an image 162 acquired by the imaging device 160. Similarly, any optical techniques now known or developed hereafter may be applied to acquired image data in order to identify and/or recognize markings from data (e.g., to stitch together data from an optical scan and subsequently identify and/or recognize markings with optical recognition techniques). Generally, optical recognition techniques may involve comparing an acquired image and/or image data to a library of data and/or images to try to find a match.

Figure 2B:
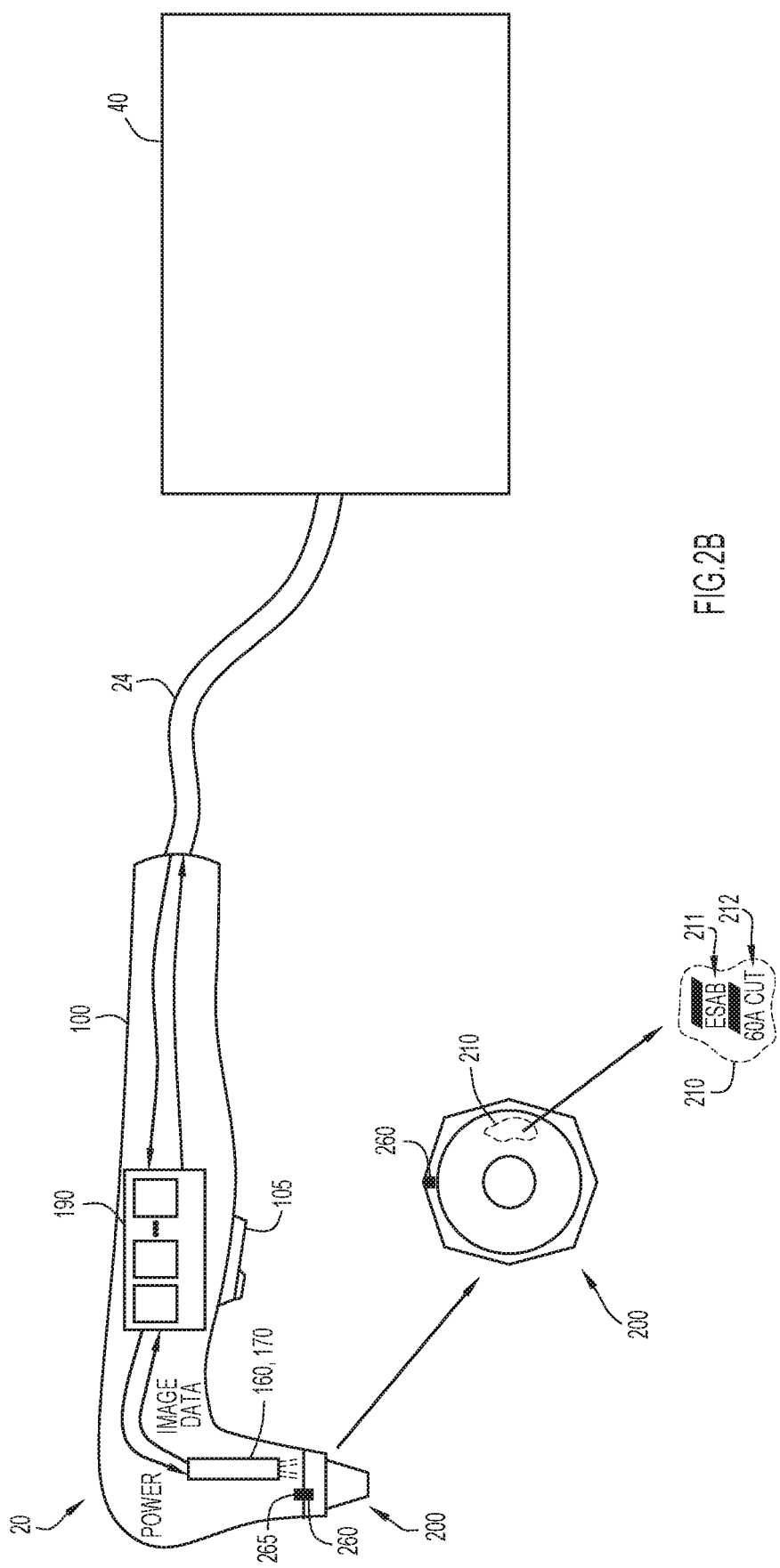
FIG. 2B is a perspective view of the torch assembly of FIGS. 1A-1C, according to an example embodiment of the present disclosure.

FIG. 2B provides another diagram representation of the torch of FIGS. 1A-1C. Consequently, like parts from FIGS. 1A-1C are labeled with the same part numbers in FIG. 2B (and the description of these parts included above may be applicable to the like parts shown in FIG. 2AB. In this embodiment, the torch body 100 houses a processor 190, such as an image processor, that is operatively coupled to the power supply 40 via cables embedded in lead 24. The processor 190 is also operatively connected to one or more torch contacts 265 and an imaging device 160 in the form of a camera (which is representative of any imaging device 160) with a built-in illumination source 170. The connection between the processor 190 and the imaging device 160 with the built-in illumination source 170 allows the processor to selectively direct power to the imaging device 160 and to receive data from the imaging device 160 (e.g., in the form of images). The connection between the processor 190 and the one or more torch contacts 265, on the other hand, may allow the processor 190 to determine when a consumable 200 has been fully and properly attached to the torch body 100 (e.g., fully secured in an alignment that is suitable for cutting operations).

More specifically, in the embodiment depicted in FIG. 2B, the consumable 200 is a unitary cartridge (e.g., a cartridge that cannot be disassembled) that is formed by pre-assembling various consumable parts (e.g., a torch tip, an electrode, an insulator, and a shield cap) into a single unit. A back surface of the cartridge includes one or more cartridge contacts 260 configured to align with and engage the one or more torch contacts 265 of the torch body 100 when the cartridge 200 is fully and properly installed onto the torch body 100 (e.g., locked in place). In at least some embodiments, one or more contacts 260 is included on an insulated or non-conductive consumable or portion of a consumable. For example, the one or more contacts 260 may be included on a plastic shield cup of a unitary cartridge.

The back surface is also printed or stamped with a marking 210 which, in this particular embodiment, includes a first marking 211 (e.g., a trademarked logo) and a second marking 212 (e.g., a process identifier). As is explained in detail below, the first marking 211 may allow the torch 20 (or cutting system as a whole) to determine if the cartridge 200 is a genuine part (i.e., produced by a known or pre-approved manufacturer) and the second marking 212 may allow the torch 20 (or cutting system as a whole) to identify a particular use for which the cartridge 200 is intended. That is, the second marking 212 may allow the torch 20 to determine operational settings for the cartridge 200, including the power (e.g., 60 Amps), gas pressure, and cutting mode (e.g., cut, pierce, or gouge) for which the cartridge is designed.

Figure 3:
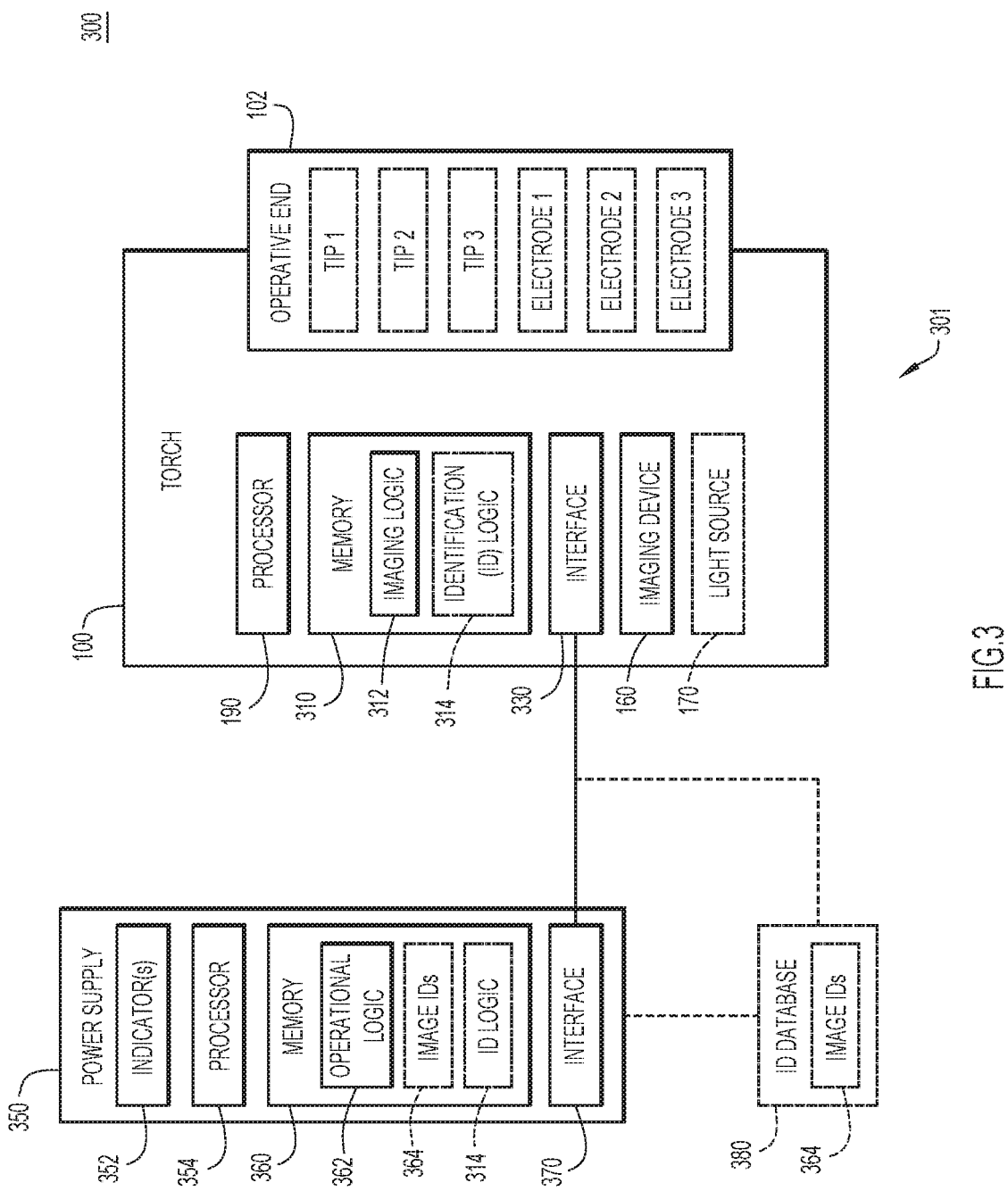
FIG. 3 is a block diagram of a torch assembly and the power supply of FIG. 1A, according to an example embodiment of the present disclosure.

Now turning to FIG. 3, this Figure depicts a high-level block diagram of a system 300 (e.g., cutting system 10) configured in accordance with the present invention. The system 300 includes a torch assembly 301 (such as the torch assembly 20 depicted in FIGS. 1A-C) and a power supply 350 (such as the power supply 40 depicted in FIG. 1A) that is configured to adjust operational parameters, such as power parameters or gas flow settings, of a welding or cutting operation. As was described above in connection with FIG. 1C, the torch assembly 301 may selectively receive interchangeable torch tips and electrodes, among other interchangeable torch components. Consequently, tips 1-3 and electrodes 1-3 are shown in dashed lines as possibly being installed on the operative end 102 of torch 30. As was also described above, the torch assembly 301 may also include a processor 190. Additionally, the torch assembly 301 may include a memory 310 and an interface 330 that provides a connection to an interface 370 included in the power supply 350. In some embodiments, the interface 330 included in the torch assembly 301 may provide a power and data connection to the power supply 350 (i.e., via separate transmission cables). For example, each interface 330 may include a wireless interface unit and a power interface unit, with the wireless interface unit enabling wireless data transfer between the torch assembly 301 and the power supply 350 and the power interface unit enabling wired power transfer from the power supply 350 to the torch 30. Alternatively, both power and data could be transmitted via wired connections.

Generally, the processor 190 (e.g., a microprocessor) may execute instructions included in memory 310 (i.e., imaging logic 312) in order to operate various components included therein or coupled thereto, such as one or more imaging devices 160 and one or more light sources 170. In some embodiments, the processor 190 may also execute imaging logic 312 to determine if required/necessary parts are in place in/on the torch assembly 301, as is discussed in further detail below. Moreover, in some embodiments, the processor 190 may execute Identification (ID) logic 314 to identify and/or recognize a component installed therein (i.e., electrode 1-3 or tip 1-3), as was discussed briefly above. Still further, the processor 190 may execute instructions included in memory 310 (i.e., imaging logic 312) in order to send data and/or instructions to the power supply 350. The operations of the processor when executing the imaging logic are discussed in further detail below in connection with FIG. 4.

Meanwhile, the power supply 350 may also include a processor 354 configured to execute instructions stored in its memory 360 (i.e., operational logic 362 and ID logic 314). An image ID data structure 364 (i.e., a table) that correlates data received from the torch assembly 301 with component identities and/or one or more operating parameters may also be stored in the memory 360 of the power supply 350. Alternatively, the image ID data structure 364 can be stored in the torch assembly 301 or an external ID database 380 that may be accessed by the power supply 350 and/or torch assembly 301 (i.e., through a network interface unit included in interface 370 and/or interface 330, respectively). As is described in further detail below in connection with FIGS. 5 and 6, in at least some embodiments, the power supply processor 354 may execute the ID logic 314 to correlate data received from the torch assembly 301 with a component identity (from image IDs 364) to identify an installed component.

Additionally or alternatively, the power supply processor 354 may execute the operational logic 362 to adjust operational parameters of a welding or cutting operation while an identified and/or recognized component is disposed in the torch. In at least some embodiments, the operational parameters may include automated cutting/welding settings (e.g., settings controlled by a computer numerical control (CNC) controller), power/current settings, and/or gas flow settings. As some examples, the automated cutting/welding settings include travel speed, pierce height, standoff height/cut height, and/or pierce dwell time. By comparison, gas flow settings, in at least some embodiments, may include the type of gas being used (e.g., oxygen, nitrogen, argon, air, etc.) a pressure or flow rate, gas function (e.g., pre-flow and post-flow, cut gas, shield gas, etc.), and/or gas sequencing. In some embodiments, the power supply processor 354 may also execute operational logic 362 to determine if required/necessary parts are in place in/on the torch assembly 301 (e.g., instead of processor 190 executing imaging logic 312 to make this determination), as is discussed in further detail below.

Still further, although not shown, in some embodiments, the interface 370 of the power supply 350 and/or the interface 330 of the torch assembly 301 may enable a connection (wired or wireless) to one or more external computing devices. In these embodiments, the external computing device(s) may include ID logic 314 and/or operational logic 362 so that the external computing device can analyze an image or image data, communicate with the power supply 350 and/or torch assembly 301, adjust operational settings of the power supply 350, or otherwise execute logic associated with at least a portion of the techniques presented herein.

Generally, memory 310 and memory 360 included in the torch assembly 301 and power supply 350, respectively, may be configured to store data, including instructions related to operating various components or any other data. Moreover, memory 310 and memory 360 may include read only memory (ROM), random access memory (RAM), magnetic disk storage media devices, optical storage media devices, flash memory devices, electrical, optical or other physical/tangible (e.g., non-transitory) memory storage devices. Thus, in general, memory 310 and memory 360 may be or include one or more tangible (non-transitory) computer readable storage media (e.g., a memory device) encoded with software comprising computer executable instructions. For example, memory 310 and/or memory 360 may store instructions that may be executed by its associated processor (processor 190 and processor 354, respectively) for automatically identifying and/or recognizing a component installed in/on a torch of torch assembly 301 and/or for automatically adjusting operational parameters in response to the automatically identifying and/or recognizing, as described herein. In other words, memory 310 and/or memory 360 may include instructions, that when executed by one or more processors, cause the one or more processors to carry out the operations described herein.

Still referring to FIG. 3, the power supply may also include an indicator or indicators 352. In some instances, the indicator(s) 352 include a current gauge, pressure gauge, fault gauge, and/or other operational control signals. Additionally or alternatively, the indicator(s) 352 may include a display that can display the identity of currently identified components and/or display warnings when a user attempts to change power settings to unsafe settings.

Figure 4:
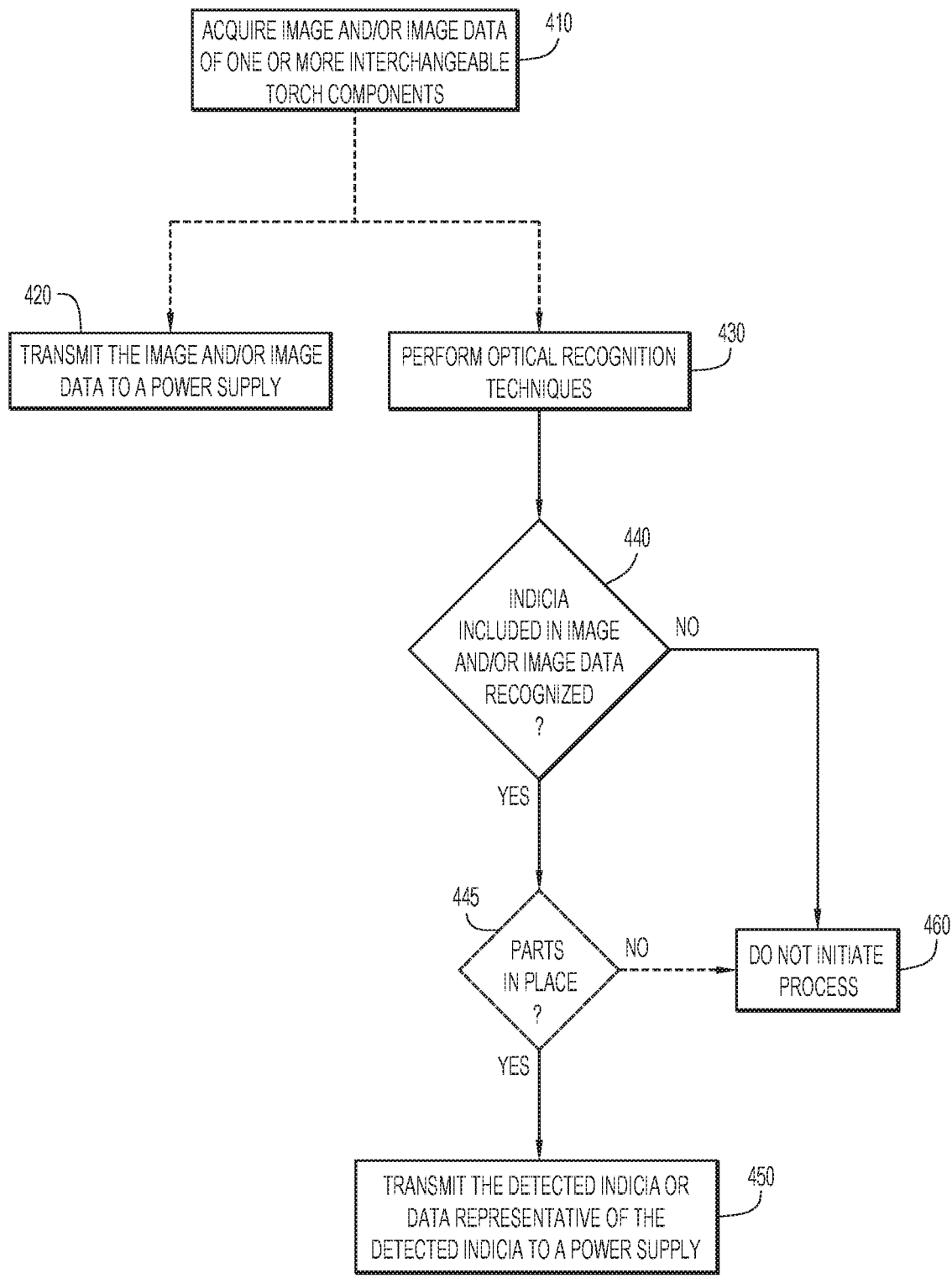
FIG. 4 is a high-level flow chart depicting operations of the torch illustrated in any of FIGS. 1A-3, according to an example embodiment of the present disclosure.

As mentioned, FIG. 4 illustrates a high-level flow chart of the operations performed by torch assembly 301 of FIG. 3 (which, again, may be representative of torch assembly 20 from FIGS. 1A-C), configured in accordance with an example embodiment. Initially, at 410, one or more imaging devices (e.g., imaging devices 160) optically acquire one or more images of and/or image data representative of one or more interchangeable torch components (e.g., consumable components) that are installed in/on the torch assembly 301 (i.e., consumable components included in a torch of torch assembly 301). In some embodiments, the one or more imaging devices constantly optically acquire one or more images of and/or image data representative of the operative end of the torch body and any interchangeable torch components installed therein. Alternatively, the one or more imaging devices may only optically acquire one or more images of and/or image data representative of the operative end of the torch body and any interchangeable torch components installed therein at predetermined intervals. The predetermined intervals may be time-based (e.g., every 30 seconds) or action-based. Exampled of predetermined, action-based intervals include intervals that start in response to: a powering-on of the power supply; a cycling of the power supply; a "fire" signal being received at a mechanized torch; an actuation of a trigger included on the torch; and/or a locking of interchangeable torch components into place on the torch body. In some embodiments, the light source included in the torch body may only illuminate the interchangeable torch components (and any indicia included thereon) at the predetermined intervals.

In some embodiments, the torch assembly transmits acquired images and/or image data to a power supply without analyzing the acquired images and/or image data at 420. For example, the torch assembly may forward acquired images and/or image data to the power supply as the images and/or image data are acquired and/or in batches or sets. Alternatively, at 430, a processor in the torch assembly (e.g., processor 190) may analyze the acquired images and/or image data with optical recognition techniques to identify and/or recognize one or more markings included on the one or more interchangeable torch components. For example, if the imaging device is constantly acquiring images and/or image data, the processor may detect changes in the acquired images and/or image data and then apply optical recognition techniques to images and/or image data when a change is detected (e.g., compare the one or more markings to a library of images). Alternatively, if the imaging device is acquiring images and/or image data at predetermined intervals, the processor may analyze each acquired image and/or image data with optical recognition techniques.

If the torch assembly applies optical recognition techniques to acquired images and/or image data at 430, the torch assembly may then determine, at 440, if one or more markings in the acquired images and/or image data are recognized. If the one or more markings are recognized at 440, the marking(s) or data representative of the marking(s) is transmitted to the power supply at 450. However, in some embodiments, prior to the transmitting at 450, the torch assembly may determine if the necessary parts for an operation are in place at 445 (this determination need not always occur and, thus, 445 is shown in dashed lines). For example, if a particular torch assembly requires an electrode, a gas distributor, a torch tip, and a shield cup to function properly for a particular plasma cutting operation, the torch assembly may determine that all of these components are currently installed on the torch assembly before initiating the operation.

If the torch assembly (or more specifically, the torch assembly's processor) determines that a necessary component is not installed (or is not properly installed), the torch assembly determines that parts are not in place at 445 and prevents the power supply from operating at 460 (i.e., by sending a signal to the power supply that prevents the power supply from supplying power). For example, if a shield cap is installed onto a torch before a torch tip is in place, the processor may determine that parts are not in place at 445 and prevent plasma cutting operations at 460. This determination may be made by counting a number of markings identified by the one or more imaging devices and comparing the number to a predetermined number (e.g., four markings may be required to determine that parts are in place) and/or by identifying markings from each of any number of pre-determined required categories (e.g., parts are in place when markings from an electrode category, a gas distributor category, a torch tip category, and a shield cup category are identified). Additionally or alternatively, the parts in place determination/assessment may depend on whether markings are seen out of a particular focus range. For example, if markings are not in focus in an acquired image, the associated part might be determined to not be properly installed and, thus, the associated part may be considered to not be in place.

If the torch does not perform a parts in place analysis at 445 (i.e., assess whether parts are in place), the marking(s) or data representative of the marking(s) is transmitted to the power supply at 450. As an example, if the markings "ESAB 60A GOUGE" are identified by an imaging device, the processor may, in some embodiments, simply transmit these markings to the power supply. Alternatively, the processor may determine operational settings based on the identified one or more markings and transmit instructions related to the operational settings to the power supply. For example, upon recognizing the markings "ESAB 60A GOUGE," the processor may instruct the power supply to provide power at 60 Amps and supply plasma gas at a pressure suitable for gouging, and set any other operational parameters necessary for gouging at 60 Amps. Transmitted instructions may be considered "data representative of the detected indicia." However, this is not the only data that is representative of the detected indicia. Other examples include digital data representative of the indicia (e.g., "valid" and "60A gouging") and analog data representative of the indicia (e.g., values assigned to valid and 60A gouging). As a more specific example, upon determining that indicia in acquired images and/or image data matches indicia stored in a library (e.g., image IDs 364), the torch assembly may transmit the image and/or image data and a "valid" determination to the power supply, which may handle the remainder of the operations associated with automatically configuring the torch assembly for the valid, identified components.

Regardless of what exactly is transmitted at 450, if the indicia are identified, the torch assembly may, at least eventually, proceed with the torch operation. If, on the other hand, at 440, the torch assembly's processor does not recognize the indicia at 410, the processor may prevent the torch assembly from operating at 460. That is, the torch assembly may be prevented from initiating a cutting- or welding-related process.

Still referring to FIG. 4, although the embodiments discussed herein have, for the most part, discussed torch assemblies with internal imaging devices, in some embodiments, the imaging device may actually be included in the power supply and the cabling between the torch assembly and power supply might include optical components to optically link the power supply with the operative end of the torch body. In these embodiments, the power supply may perform the operations depicted in FIG. 4. Alternatively, the torch assembly may gather information from the power supply (or another external imaging device, such as an imaging device disposed on a lead of the torch assembly that extends between the torch and the power supply) that is acquiring images and/or image data of the operative end of the torch (and any components installed therein).

Figure 5:
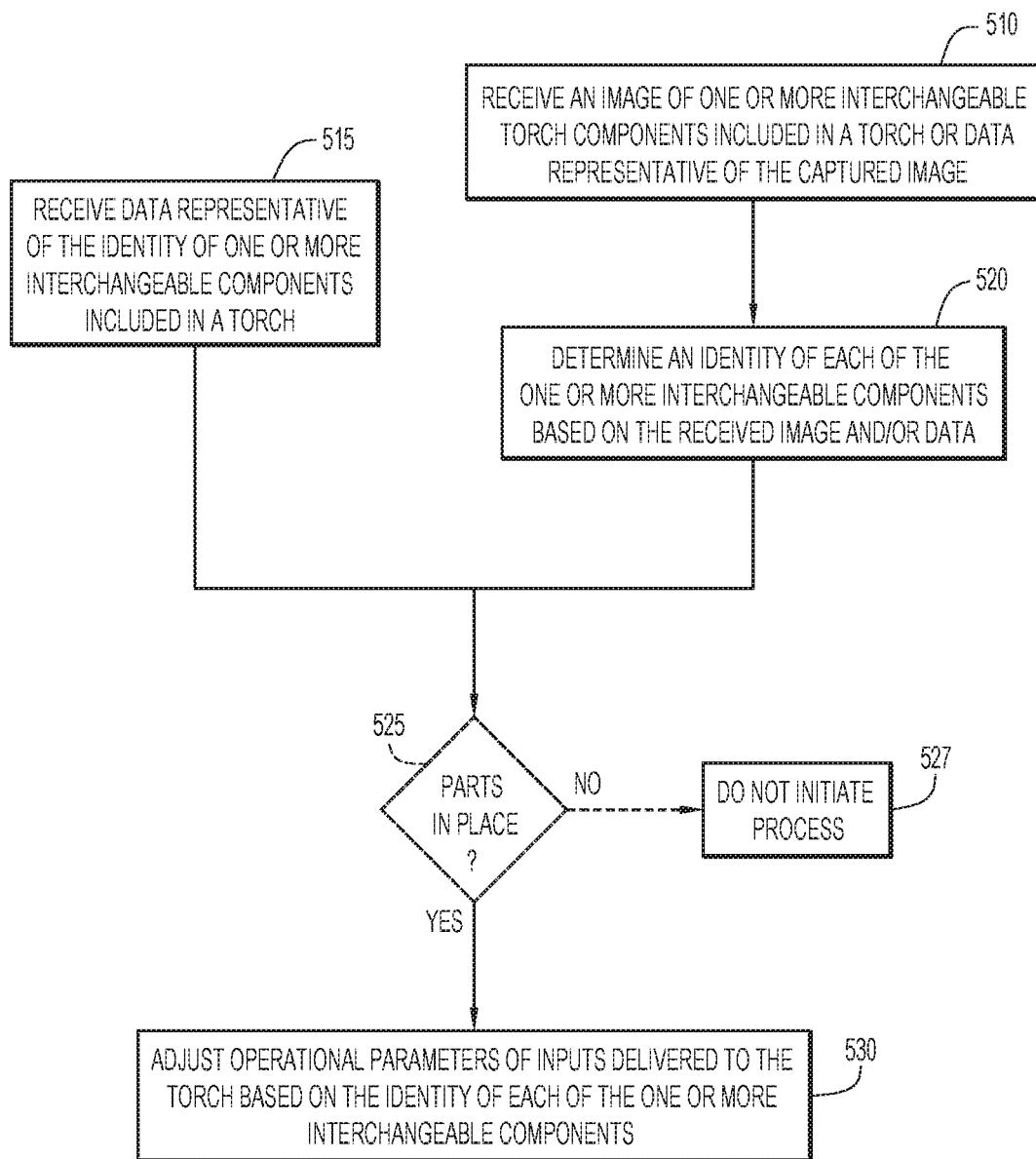
FIG. 5 is a high-level flow chart depicting operations of the power supply of FIG. 3, according to an example embodiment of the present disclosure.

FIG. 5 depicts a high-level flow chart of the operations of the power supply configured in accordance with an example embodiment. Initially, at 510 or 515, the power supply receives data from the torch assembly. More specifically, at 510, the power supply receives one or more images and/or image data of one or more interchangeable torch components included in a torch or data representative of the acquired images and/or image data. As mentioned above, data representative of the acquired images and/or image data may include digital data representative of the indicia (e.g., "valid" and "60A gouging"), analog data representative of the indicia, and instructions for adjusting the operational parameters. If the data is or includes instructions, the power supply may simply adjust the operational parameters provided to the torch assembly at 530 (and, thus, 525 is shown in dashed lines).

However, if the data neither includes instructions nor identifies the interchangeable torch components (this data is received at 515), the power supply must determine the identity of the one or more interchangeable torch components with indicia in the acquired images and/or image data. For example, if the power supply receives the images and/or image data, the processor in the power supply may apply optical recognition techniques to the images and/or image data. As another example, if the power supply receives analog or digital data representative of indicia identified in an acquired images and/or image data, the power supply may query a lookup table with this data to identify one or more interchangeable torch components associated with the indicia represented by the received data. Notably, in embodiments that identify combinations of interchangeable torch components at the power supply, one or more imaging devices may send data to the power supply so that, at 510 (or 515), the power supply may be receiving data from multiple sources.

If at 515 or 520 the power supply does not receive an identity or is unable to determine an identity, respectively, the power supply may determine that an interchangeable torch component is incompatible with the particular torch assembly, be it a plasma cutting torch assembly, a welding torch assembly, or any other torch assembly (the plasma components mentioned herein are merely examples, and the techniques presented herein may identify any components for any torch assembly type). For example, if data received at 510 indicates that the component does not include indicia, the power supply may determine that the interchangeable torch component is incompatible with the torch assembly.

In some embodiments, the power supply may also determine whether parts are in place at 525 (however, in some embodiments, the power supply does not determine/assess if parts in place and, thus, 525 is shown in dashed lines). The power supply makes this determination in accordance with the description of step 445 included above which, for brevity, is not repeated here. That is, in some embodiments, the power supply determines whether parts are in place and, thus, the description of 445 included above may be applicable to step 525. In some of these embodiments, the power supply determines if parts are in place in lieu of the torch assembly making this determination. Alternatively, the power supply and torch assembly may work together to determine if parts are in place. That is, the power supply and torch assembly may complete operations described above in connection with 445 in tandem or unison. In still other embodiments, the torch assembly may render a parts in place determination/assessment independently (and, the power supply can ignore this step). If the power supply analyzes indicia to determine whether parts are in place, the power supply may refrain from initiating a welding or cutting process, at 527, when parts are not in place. When parts are in place, the power supply may proceed to step 530.

At 530, the power supply adjusts the operational parameters of the torch assembly based on the identity determined at 520. For example, if an interchangeable torch component is identified as a 60 Amp or 40 Amp cutting tip for a plasma cutting torch assembly, the power supply may adjust the power delivery so that 60 Amps or 40 Amps of current are delivered to the torch assembly, respectively. Moreover, if the power supply detects that a user is attempting to change the current to 100 Amps when the power supply has determined that the 60 Amp or 40 Amp torch tip is installed on the torch body, the power supply may automatically roll the current back to a safe level (i.e., to 60 or 40 Amps). That is, in some instances, the techniques may not prevent arc initiation, but will ensure arc transfer is effectuated with optimal operational parameters (to ensure safety and high quality operations). Alternatively, if the torch tip is identified as a gouging tip, the power supply may be set to a gouging mode. Still further, if the torch tip is unidentified, the power supply may either prevent arc transfer to a work piece or limit the operational settings to very low levels to ensure that the unidentified component does not fail and damage other torch components or endanger the end user. This may prevent counterfeit or unsuitable/undesirable components from being used with or damaging the torch body.

Figure 6:
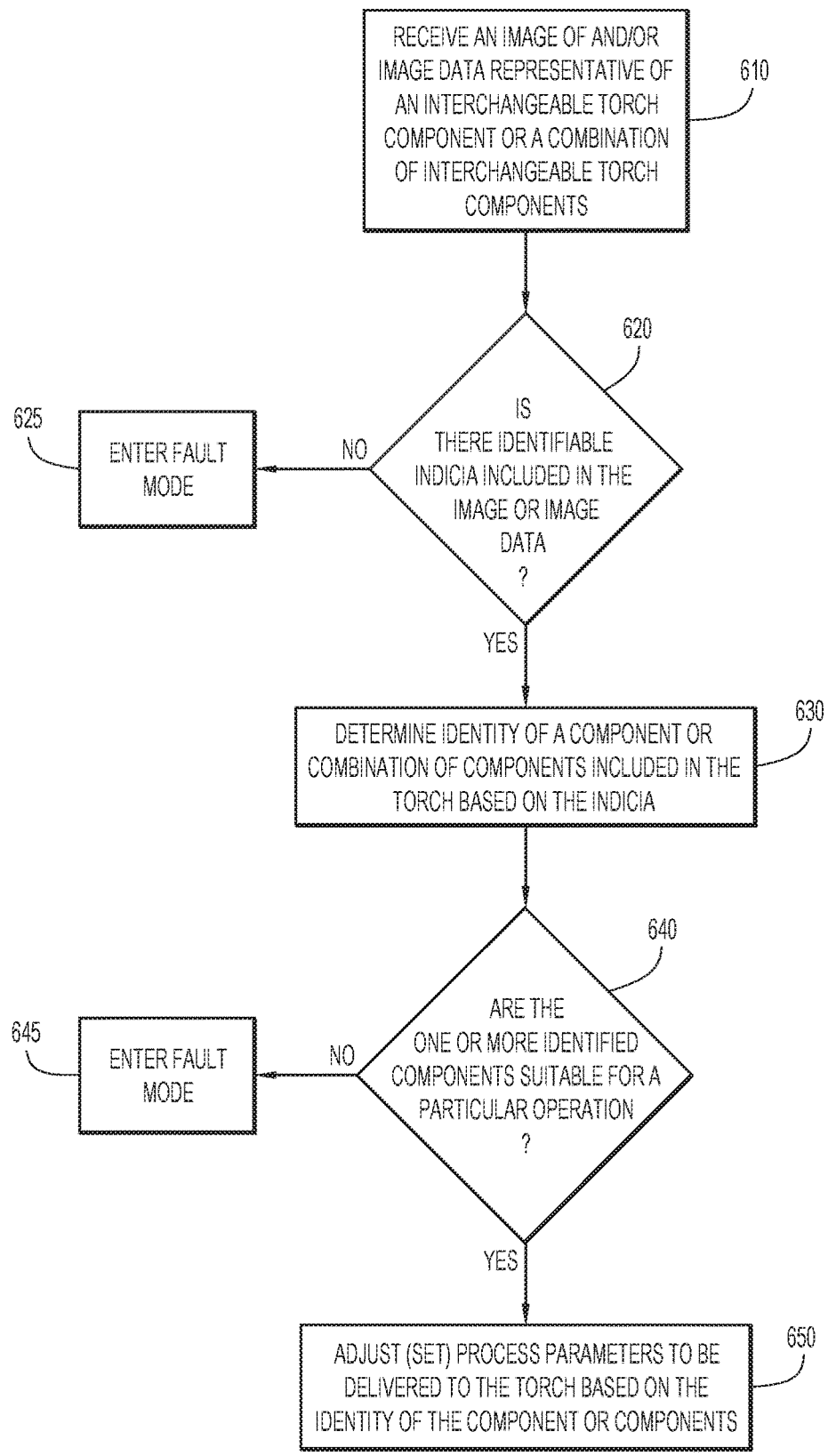
FIG. 6 is a high-level flow chart depicting operations of the power supply of FIG. 3, according to another example embodiment of the present disclosure.

Now turning to FIG. 6, this Figure depicts another high-level flow chart of the operations of the power supply configured in accordance with another example embodiment. In FIG. 6, the power supply initially receives acquired images and/or image data of an interchangeable torch component or a combination of interchangeable torch components from the torch assembly at 610. At 620, the power supply determines if the one or more interchangeable torch components included in the acquired images and/or image data include any identifiable indicia. This determination may determine if the parts are genuine (i.e., suitable for the torch assembly and not counterfeit). That is, this determination may attempt to recognize a component as a genuine component. In some embodiments, the library of images used to identify indicia may include tags indicating whether indicia are genuine. Alternatively, the library of images may only include genuine indicia so that only genuine indicia are identified.

If identifiable indicia are found/recognized at 620 (and, thus, the parts are determined to be genuine at 620), the power supply may then determine identities for any identifiable interchangeable torch components currently installed in or on the torch assembly at 630. At 640, the power supply determines whether the identified interchangeable torch components are consistent or compatible for a particular cutting/welding operation. To make this determination, the power supply may determine if multiple identified interchangeable torch components can or should be used together and/or if one or more identified interchangeable torch components are suitable for a selected welding/cutting operation. For example, the power supply may determine if an electrode, a torch tip, a gas distributor, and a shield cup currently installed in/on a torch assembly are all suitable for a 100 Amp air/air cutting operation.

If, instead, at 620 the power supply determines that one or more parts are not genuine and/or unsuitable for the particular torch assembly (i.e., one or more parts are counterfeit or otherwise not recognized as genuine), the power supply may enter a fault mode at 625. Similarly, if, at 640, the power supply determines that at least one of the identified interchangeable torch components is incompatible with other identified interchangeable torch components (i.e., one interchangeable torch component is not suitable for 100 Amp air/air cutting) the power supply may enter a fault mode at 645. When the power supply is operating in fault mode, it may prevent operations of the torch assembly. Alternatively, in fault mode, the power supply may limit operations of the torch to operations that will not experience a degradation in quality and/or become unsafe when operating with the identified interchangeable torch components. By comparison, if the power supply determines that the identified interchangeable torch components are compatible with each other and/or suitable for a particular cutting/welding operation, the power supply may automatically adjust, at 650, process parameters (i.e., operational parameters) to be delivered to the torch assembly based on the identity of the component or components. That is, the power supply (or the torch assembly) may determine that identified components are all intended to be used for a particular operation and the power supply may adjust operational parameters of the torch assembly to support the particular operation.

Now turning to FIGS. 7A-B, 7C-D, 8A-B, 8C-D, 9A-B, and 9C-D, these Figures illustrate diagrams of various example implementations of the techniques presented herein. In each of the implementations depicted in FIGS. 7A-B, 7C-D, 8A-B, 8C-D, 9A-B, and 9C-D, a processor included in the torch assembly 301 (e.g., processor 190) operates a camera 160 with a built in illumination source 170 to acquire an image of a marking 210 and performs image processing of the image. However, as has been discussed repeatedly herein, a camera is just one example of an imaging device and in other embodiments, the torch assembly 301 can include one or more imaging devices configured to acquire images or image data. Similarly, an image is only one type of data that may be acquired, as is discussed in detail below. Put another way, the implementations discussed depicted in FIGS. 7A-B, 7C-D, 8A-B, 8C-D, 9A-B, and 9C-D are each described with respect to specific examples, but these examples are not intended to be limiting and each of the implementations could be modified in view of any of the description included herein.

Figure 7A:
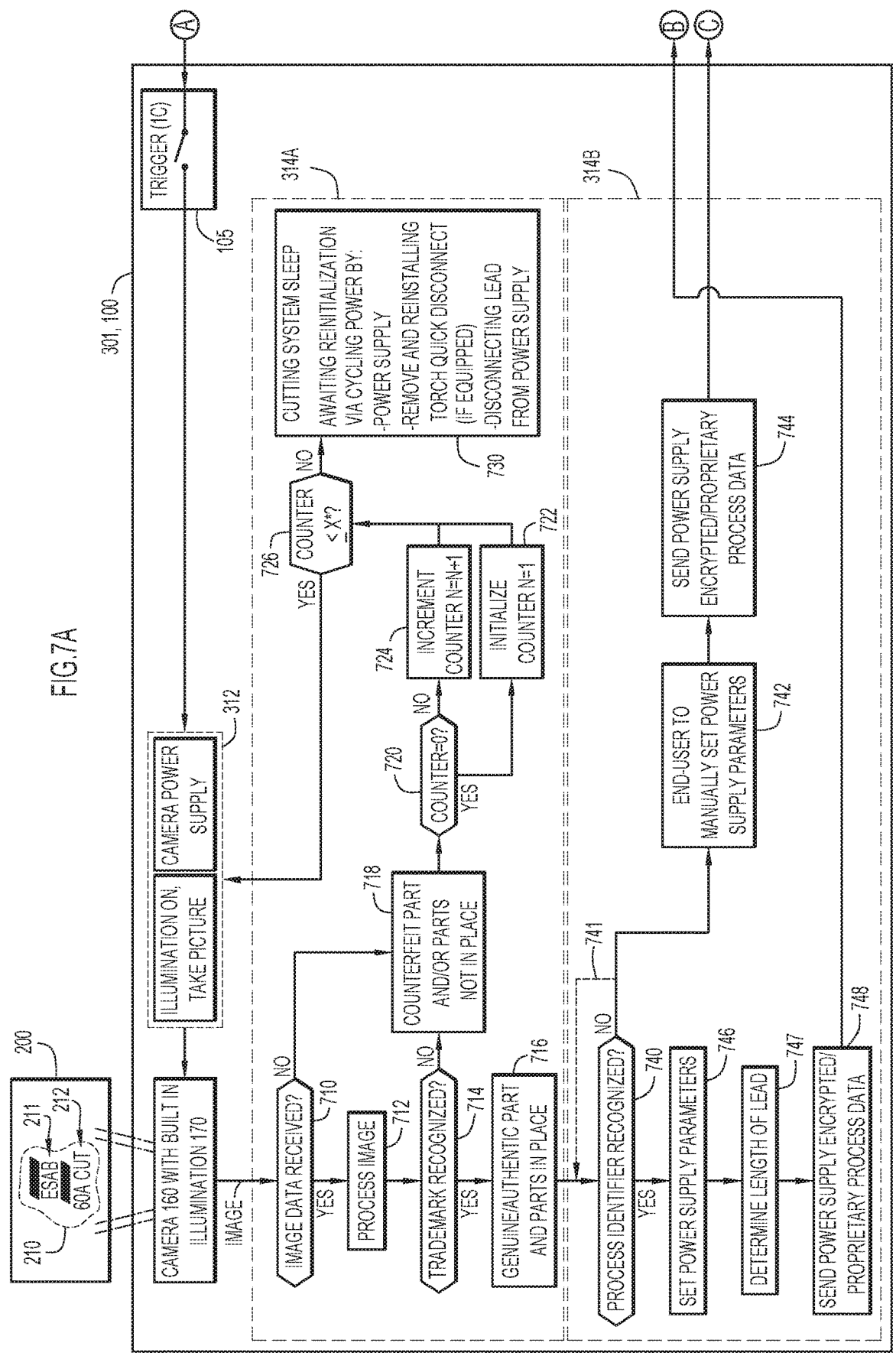

Overall, there are two main differences between the various implementations depicted in FIGS. 7A-D, 8A-D, and 9A-D: (1) the manner in which the camera is initiated; and (2) the manner in which signals are sent to the power supply. Each pair of figures (e.g., FIGS. 7A-B and 7C-D, FIGS. 8A-B and 8C-D, and FIGS. 9A-B and 9C-D) depicts a different camera initiation method and, within each pair, the two diagrams depict different signaling options. However, the signaling options are largely constant across the pairs. For example, FIGS. 7A-B and 7C-D depict two different signaling options, but the signaling options from FIGS. 7A-B are also depicted in FIGS. 8A-B and 9A-B. Meanwhile, FIGS. 7A-B and 7C-D depict a first camera initiation method, FIGS. 8A-B and 8C-D depict a second camera initiation method, and FIGS. 9A-B and 9C-D depict a third camera initiation method. Aside from these differences, many of the steps of the implementations shown in depicted in FIGS. 7A-D, 8A-D, and 9A-D are similar across the implementations, if not identical. Thus, like portions of these Figures are labeled with like reference numbers and, for brevity, like reference numbers are only described once.

With that in mind, FIGS. 7A-B is now described in detail. The process begins at 702, which may be indicative of a power supply 350 being powered on (e.g., when a user flips a power switch or plugs in power supply 350). In FIGS. 7A-B (as well as FIGS. 8A-B and 9A-B) the depicted power supply is a "smart" power supply that is implementing at least a portion of the techniques presented herein (the power supply in FIGS. 8A-B is smart, but differs slightly as compared to the power supplies depicted in FIGS. 7A-B and 9A-B and, thus is labeled at 350"). By comparison, the power supplies depicted in FIGS. 7C-D, 8C-D, and 9C-D are "dumb" power supplies 350' that are not implementing any of the techniques presented herein. That is, the dumb power supplies 350' may be traditional or known power supplies from pre-existing systems. Thus, FIGS. 7A-B, 8A-B, and 9C-D illustrate how the techniques presented herein may be useful when incorporated only into a torch assembly 301 that is used with any desired power supply.

Still referring to FIGS. 7A-B, after 702, a start/power circuit 704 provides power to the torch assembly 301 and, in particular, begins to deliver power to circuitry associated with a trigger 105 of the torch assembly 301. Then, when a user actuates the trigger 105 (thereby closing the trigger circuitry, which is illustrated as a single switch, but may include any desirable circuitry), the power from the power supply 350 is delivered to a camera 160 with a built-in illumination source 170. Imaging logic 312 (e.g., as was introduced in FIGS. 1C-3) may control this transfer of power.

When the camera 160 and its built-in illumination source 170 receive power, the camera 160 is able to acquire an image of one or more markings 210 on one or more consumables 200 attached to the torch assembly 301. In the embodiments depicted in FIGS. 7A-B-9C-D, the consumable 200 is a unitary cartridge and the one or more markings 210 include a first marking 211 and a second marking 212. The first marking 211 is a trademarked logo that can be used to determine the unitary cartridge 200 is a genuine/authentic part and the second marking 212 is a process identifier that can be used to determine the process for which that the unitary cartridge 200 is intended. However, these are just examples and, as has been discussed repeatedly herein, in other embodiments, the techniques herein can recognize and identify any desirable interchangeable component based on images or image data of a wide variety of markings (i.e., one or more passive, mechanical markings).

Still referring to FIGS. 7A-B, once the camera 160 acquires an image of the first marking 211 and/or the second marking 212, this image is passed to an image processor included in the torch (e.g., processor 190, as was introduced in FIGS. 1C-3) and the image processor executes ID logic 314 (a subcomponent of ID logic 314, which was also introduced in FIGS. 1C-3) to identify the consumable based on the image of marking 210. More specifically, initially, the image processor executes genuine part ID logic 314A to determine if the consumable is genuine based on the first marking 211. Then, the image processor executes process ID logic 314B (a subcomponent of ID logic 314) to determine operational parameters associated with the cartridge 200 based on the second marking 212.

When executing genuine part ID logic 314A, the image processor first determines, at 710, whether an image has been received. This determination may provide a check on the camera 160 to ensure that the camera 160 is not malfunctioning (e.g., to determine if the camera is not capturing images). When an image has been received, the image processor processes the image at 712 using optical character recognition techniques (as described above) and attempts to recognize a trademark at 714. If data is not received at 710 or a trademark is not recognized at 714, the genuine part ID logic 314A (or more specifically, the processor executing this logic) determines, at 718, that either an unmarked cartridge 200 (e.g., a counterfeit part) is installed in the torch body 100 or that a cartridge 200 is not properly installed in the torch body 100. If the process moves to step 718, the genuine part ID logic 314A then begins to try to re-image the one or more markings 210. This re-imaging cycles until a counter (counting the imaging attempts) reaches a predefined threshold, as is shown by steps 720, 722, 724, and 726, which illustrate a counter initializing at one at 720/722, incrementing by 1 at 720/724, and checking against the threshold at 726. The predefined threshold may be an integer value that is used to limit a number of cycles, a time value, or a combination of these values.

Once the counter reaches the threshold, the camera 160 stops trying to acquire an image of the one or more markings 210 and, instead, the genuine part ID logic 314A causes the camera 160 to stop operations while also causing the cutting system as a whole to sleep at 730. That is, if the first marking 211 is not recognized as a predetermined trademark at 714, the torch assembly 301 will not send a start signal to the power supply and, thus, the torch assembly 301 will not receive any cutting or arc initiation power. Put simply, the cutting system will not be able to cut if the first making 211 is not recognized with optical recognition techniques. For example, the system will act as if the trigger 105 was never actuated. However, as is discussed above, in different embodiments, the cutting system may respond in different manners when the first marking 211 is not recognized (e.g., by providing the torch assembly with only a minimal level of power). Once the system is asleep at 730, the system can be re-initialized by cycling power to the torch assembly 301 (i.e., turning the torch assembly 301 off and then on). This cycling can be accomplished by restarting the power supply 350, temporarily detaching the torch assembly 301 from the power supply 350 (e.g., by disconnecting the lead from the power supply 350), or temporarily detaching the torch body 100 of the torch assembly 301 from its lead (e.g., via a quick disconnect).

If, instead, the first marking 711 is recognized at 714 (e.g., if the cartridge includes an ESAB logo that includes black bars above and below the lettering), the genuine part ID logic 314A may determine that the cartridge is genuine and may also determine that the cartridge 200 is in place. That is, in the depicted embodiment, the optical imaging of a consumable may not only recognize consumables as genuine, but may also replace typical parts-in-place or safety circuits. In these embodiments, the genuine part ID logic 314A may only consider a trademark as recognized when it is seen in a specific location, such as a specific radial location at an operative end of a torch assembly 301 (e.g., at 12 o'clock).

Once a cartridge 200 is determined to be genuine and in-place by the genuine part ID logic 314A, the process ID logic 314B may attempt to determine the purpose for which the cartridge 200 is intended based on the second marking 212 (the "process identifier"). Thus, initially, the process ID logic 314B determines, at 740, if the process identifier 212 has been recognized in the image captured by camera 160. In at least some embodiments, if the first marking 211 is recognized at 716 (thereby causing the torch to begin executing process ID logic 314B) but the second marking 212 is not identified at 740, the process ID logic 314B may try to re-analyze the acquired image at 740 (as indicated by dashed arrow 741). Alternatively, although not shown, the process ID logic 314B could cause the camera to re-image the one or more markings 210 to attempt to identify a second marking 212. The re-analyzing and/or the re-imaging may cycle until a counter (counting the re-imaging and/or re-analyzing attempts) reaches a predefined threshold, just like the cycling/counter illustrated by steps 720, 722, 724, and 726. However, notably, if the re-imaging or re-analyzing times out at 740/741, the system will not sleep. Instead, since the cartridge 200 has already been recognized as genuine, the torch assembly 301 will still signal the power supply 350 to fire the torch assembly 301, just without providing any operational settings that are determined based on process identifier 212, as is explained in detail below.

More specifically, if the process identifier 212 is recognized at 740, the image processor executes the process ID logic 314B to determine power supply parameters (e.g., current, gas pressure, and operating mode) for the power supply 350 to deliver to the torch assembly 301 at 746. If the process identifier 212 is not recognized at 740, the process ID logic 314B determines, at 742, that the power supply parameters will need to be set manually at the power supply 350. Then, the torch assembly 301 sends a signal to the power supply at either 744 or 748. Notably, if the torch assembly 301 signals the power supply 350 at 748, the signal includes power supply parameters, but if the torch assembly 301 signals the power supply 350 at 744, the signal does not include power supply parameters. That is, once the camera 160 acquires an image of the one or more markers 210 and the image is processed by the genuine part ID logic 314A and the process ID logic 314B, the torch assembly 301 either: (a) sends a signal to the power supply 350 at 748 that causes the power supply 350 to automatically set operational settings of the torch assembly 301 (e.g., automatically adjust the cut mode, power, and gas pressure); or (b) sends a start signal to the power supply at 744 that indicates the torch assembly 301 is ready to fire. In the latter scenario (i.e., option (b), where the image processor instructs the power supply to use manually input operational parameters), a user will need to manually input operational parameters. Notably, the torch assembly need not send signals at both 744 and 748. Instead a signal is sent at 744 or at 748.

In the embodiment depicted in FIGS. 7A-B, each signal sent from the torch assembly 301 to the power supply 350 is encrypted at the torch assembly 301. Thus, when the power supply 350 receives a signal from the torch assembly 301, a processor included in the power supply (e.g., processor 354 from FIG. 3) executes image ID logic 364 to decrypt the signal and operate the power supply 350 based on the signal. More specifically, if a signal is sent at 744, the signal is decrypted at 762 and the power supply 350 determines that manually input cutting parameters are required at 764 (in some embodiments, the power supply may alert a user, at 764, that cutting parameters need to be manually set, such as via an alert on a display, flashing an indicator, etc.). Meanwhile, if a signal is sent at 748, the signal is decrypted at 752 and the power supply 350 automatically sets cutting parameters at 754 based on data in the decrypted signal.

Once operational parameters are set at 764 or 754 (manually or automatically, respectively), the power supply 350 displays the parameters at 770 and, executes its operational logic 362 to determine, at 772, that an attached torch is ready to fire and to apply the selected operational parameters at 774 (either automatically or manually). The torch then fires at 780.

Notably, due the foregoing power, data, and logic flows, the example implementation depicted in FIGS. 7A-B images cartridge 200 (or other consumables installed on the torch body 100) every time the trigger 105 is pulled to: (1) determine whether the one or more installed components are genuine; and (2) attempt to determine appropriate operational settings for the one or more installed components. This ensures that genuine components (e.g., a genuine cartridge) are properly installed for each use of the torch assembly 301 and may also ensure proper operational parameters are used for each use of the torch assembly 301. Meanwhile, the camera 160 may be protected from burning out due to the governing of camera actuations with the threshold. As one example, limited cycling may prevent the camera from trying to continuously image an absent consumable cartridge if a trigger were accidentally left depressed between uses of a torch assembly (the torch 100 would not be firing in this scenario since the torch assembly 301 would not recognize a genuine part in place).

Figure 7C:
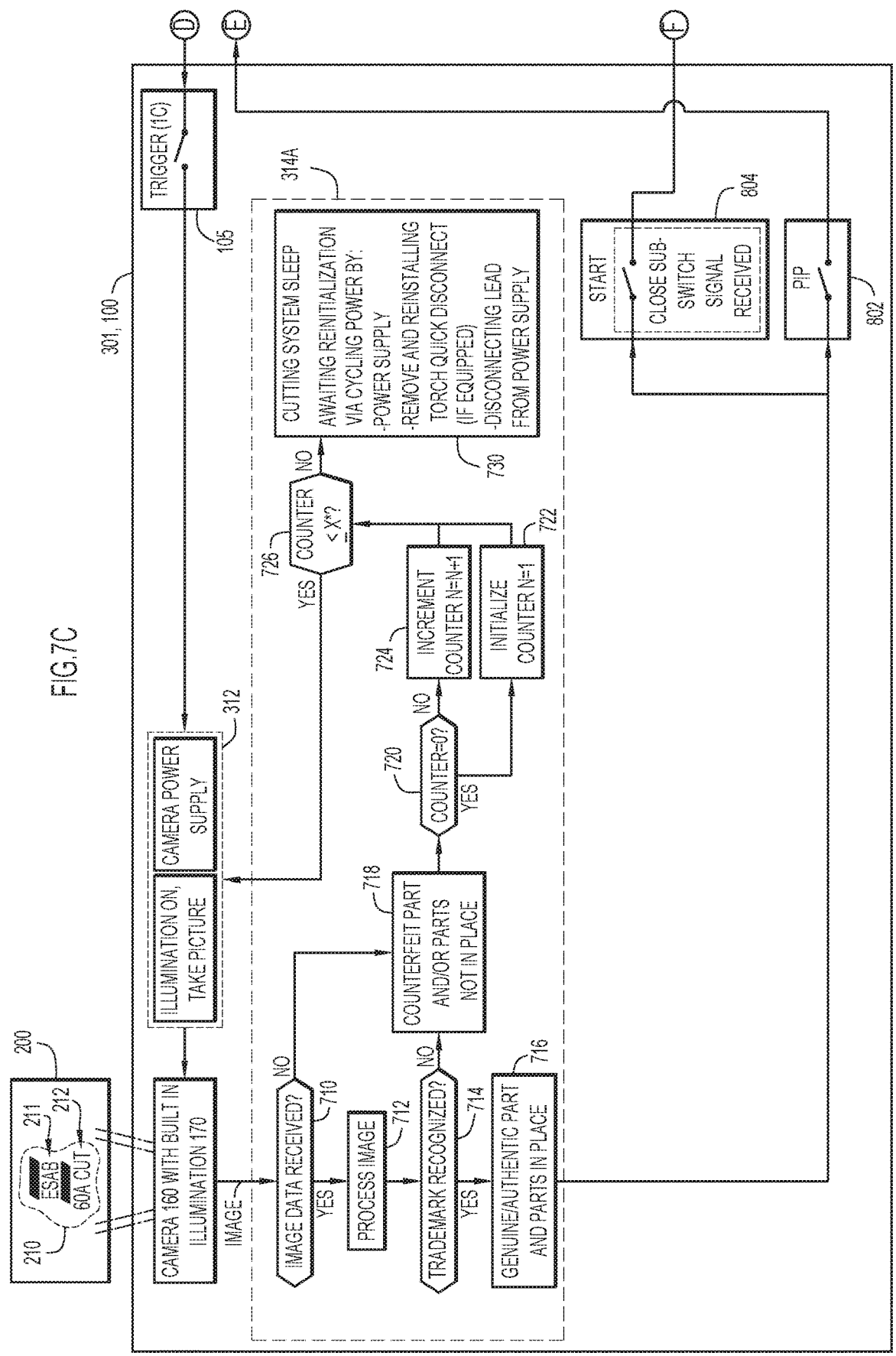
Figure 8B:
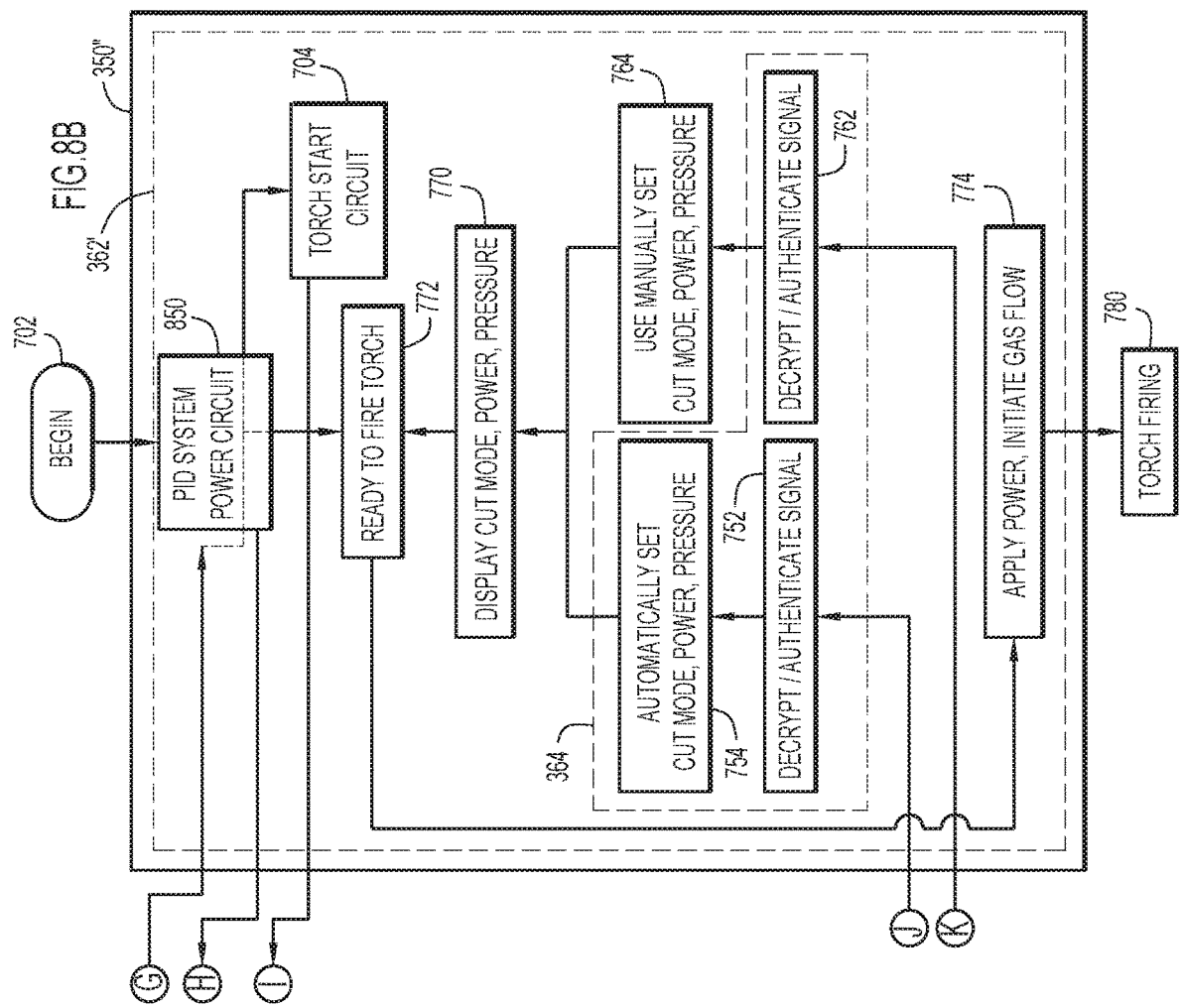

Now turning to FIGS. 7C-D, this example implementation is identical to at least a portion of the implementation shown in FIGS. 7A-B; however, now, the torch assembly 301 is connected to a dumb power supply 350' and the torch assembly 301 is unconcerned with the second marking 212. Thus, the torch assembly 301 does not include or does not execute process ID logic 314B. Instead, if the genuine part ID logic 314A determines that a consumable 200 is genuine and in-place at 716, the genuine part ID logic 314A toggles two switches in the torch assembly 301 which indicate to power supply 350' that the torch 301 is ready to fire.

In particular, the torch assembly 301 of FIGS. 7C-D closes a parts-in-place (PIP) switch 802 and a start switch 804. Switches 802 and 804 may be real or virtual switches (e.g., mechanical or solid state switches). For example, in some embodiments, a microprocessor executing logic 314A may output a specific voltage at 716 that close switches 802 and 804. Once switches 802 and 804 are closed, the torch's processor sends two signals to the power supply 350': a signal indicating that parts are in place (i.e., a "parts-in-place signal") and a signal (e.g., a high-low signal) indicating the torch assembly 301 is ready to fire. The signal sent through the start switch 802 may be a non-encrypted version of the signal sent to the power supply at 744 of FIGS. 7A-B while the signal sent through switch 802 is sent to a PIP circuit 810 included in power supply 350. Once the power supply 350 processes both of these signals, the power supply 350 determines it is ready to fire at 772.

Generally, the implementation illustrated in FIGS. 7C-D would allow a torch assembly 301 implementing the techniques presented herein to operate with a variety of "dumb" power supplies. By comparison, the implementation illustrated in FIGS. 7A-B may allow a torch assembly 301 implementing the techniques presented herein to only work with a "smart" power supply 350 also implementing the techniques presented herein. In order to ensure that users would not have to acquire a new power supply when acquiring a torch assembly 301 that implements the techniques presented herein, the logic shown in FIGS. 7A-B and 7C-D could be included in one physical torch assembly 301 as two different modes. Thus, the torch assembly 301 could operate with a "smart" power supply 350 or a dumb power supply 350'. In this scenario, the torch assembly 301 might operate in accordance with FIGS. 7C-D unless it receives a signal from a power supply indicating it should operate in accordance with FIGS. 7A-B. Thus, the torch assembly 301 would need to be configured for bi-directional communication.

Figure 7E:
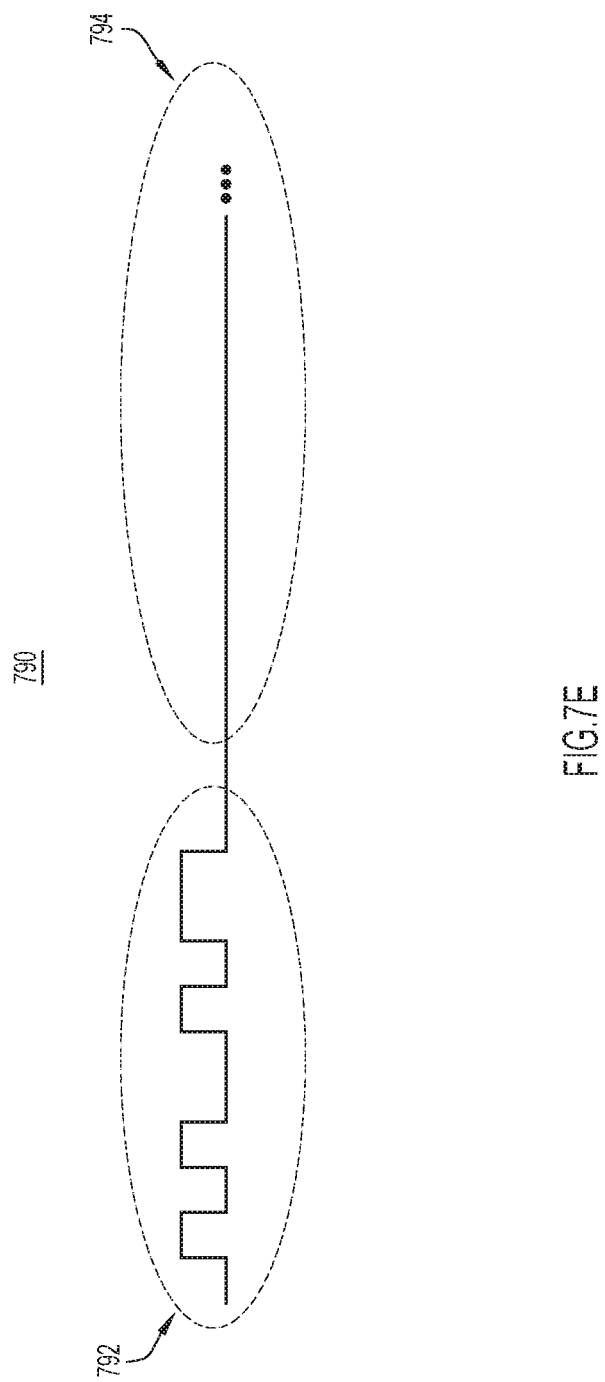
FIG. 7E is a diagram depicting a start signal sent from a torch to a power supply when the torch is implementing the techniques presented herein in accordance with an example embodiment.

As another alternative, the encrypted signal sent by the torch assembly in FIGS. 7A-B could be only partially encrypted, as shown in FIG. 7E, to allow a torch assembly 301 implementing the logic shown in FIGS. 7A-B to be used with both a "dumb" power supply 350' a "smart" power supply 350 (or 350"). As is shown, a partially encrypted signal 790 can include an encrypted portion 792 followed by a non-encrypted portion 794. The encrypted portion 792 would occur first and would persist for a first amount of time. The first amount of time could be predetermined or dynamically determined, but is selected so that a dumb power supply would not see or would not react to the encrypted portion 792. For example, a "dumb" power supply might just see the encrypted portion 792 as noise. The non-encrypted portion 794 includes a standard "On" signal (e.g., a high-low signal) and occurs after the encrypted portion 792.

Due to this structure, a "dumb" power supply would receive a standard "On" signal after seeing noise and operate based on the "on" signal, but a "smart" power supply implementing the techniques presented herein would read and react to the encrypted portion 792 before the non-encrypted portion 794 arrived. The smart power supply would then either ignore the non-encrypted portion 794 or use the "On" signal in the non-encrypted portion 792 to maintain power supply settings (notably, while the "On" signal persists, the torch has maintained power and hasn't had components changed causing a reset condition). In view of the foregoing, the implementations of FIGS. 7A-B and 7C-D could be combined into one torch assembly that is usable with smart and dumb power supplied alike by using a partially encrypted signal 790 at 744 and 748 of FIGS. 7A-B. That is, utilizing a partially encrypted signal 790 could allow the torch assembly to operate based on a single set of software when connected to smart or dumb power supplies.

Now turning to FIGS. 8A-B, 8C-D, 9A-B, and 9C-D, these Figures illustrate modified embodiments of FIGS. 7A-B and 7C-D, respectively. As mentioned above, for brevity, only the differences between the various implementations are described below and any description of like portions of FIGS. 7A-B, 7C-D, 8A-B, 8C-D, 9A-B, and 9C-D, as well as the description related to combining the two implementations, is to be understood to apply to the implementations shown in FIGS. 8A-B, 8C-D, 9A-B, and 9C-D. In FIGS. 8A-B, 8C-D, 9A-B, and 9C-D the most notable change from their counterparts illustrated in FIGS. 7A-B and 7C-D is that the implementations shown in FIGS. 8A-B, 8C-D, 9A-B, and 9C-D do not use optical recognition techniques to determine PIP. Thus, at 716' and 718' logic 314A only determines if a part is genuine and is unconcerned with whether a part is in place (which is considered at 716 and 718 of FIGS. 7A-B and 7C-D).

More specifically, in the implementations depicted in FIGS. 8A-B, 8C-D, 9A-B, and 9C-D, the cartridge 200 and the torch body 100 of the torch assembly 301 both include one or more contacts (e.g., contacts 260 and 265 of FIG. 2B) so that when the cartridge 200 is properly installed on the torch body 100, the contacts engage and form an electrical connection so that cartridge 200 closes a PIP circuit 852. For example, contacts could be included on a shield cup or another insulated component of a unitary cartridge. Thus, in FIGS. 8A-B, 8C-D, 9A-B, and 9C-D, the power supply 350 can only deliver power to the trigger 105 once the PIP circuitry is closed, such as by engagement between torch contacts and consumable contacts.

In FIGS. 8A-B and 8C-D, PIP is determined based on a separate feedback loop and a completed PIP determination is a perquisite to initiating the optical recognition techniques (as executed by logic 314A and 314B). In the implementation of FIGS. 8A-B (e.g., a PIP perquisite implementation with a smart power supply 350" that is slightly modified as compared to power supply 350), this is accomplished by first delivering power to a parts identification (PID) system power circuit 850. The PID system power circuit 850 can deliver power to the PIP circuit 852 of the torch assembly and can signal the torch start circuit 704 when the PIP circuit 852 has been closed/satisfied. In the modified version of power supply 350", the PID system power circuit 850 also signals the operational logic 362 of the power supply 350 to indicate that parts in place (as indicated by the arrow from 850 to 772), so that the power supply 350" needs to wait for only a start signal before being ready to fire.

On the other hand, in the implementation of FIGS. 8C-D (e.g., a PIP perquisite implementation with a dumb power supply), PIP is used as a perquisite by modifying the torch assembly 301 so that the start circuit 704 of the dumb power supply 350' delivers power to PIP circuit 852 instead of the trigger 105 (even though the power supply 305' may be delivering power in the same manner as FIGS. 7C-D). Then, once the PIP circuit 852 is closed (e.g., once parts are in place), the PIP circuit 852 in the torch assembly 301 signals the PIP circuit 810 of the power supply 350 while also delivering power to the trigger 105. Once the PIP circuit 810 receives a signal from the torch assembly 301, the PIP circuit signals that parts are in place (as indicated by the arrow from 810 to 772), so that the power supply 350' needs to wait for only a start signal before being ready to fire.

Thus, in the implementations of FIGS. 8A-B and 8C-D, power is only delivered to trigger 105 when parts are in place. If the trigger is pulled after parts are in place, each implementation proceeds in the same manner as discussed above with regards to FIG. 7A-B or 7C-D (and optionally FIG. 7E as well). Importantly, both power supply 350" and power supply 350' will only fire the torch when both a PIP signal and a fire signal are received at 722. Thus, in each of these embodiments, the torch assembly 301 will not fire when parts are in place but the trigger has not initiated execution of logic 314A and/or 314B. Instead, the torch assembly 301 will fire when a start signal sent at 744, 748, or 804 supplements the PIP signal at power supply 350" or power supply 350.

By comparison, in FIGS. 9A-B and 9C-D, the torch assembly 301 and/or the smart power supply 350 is/are also modified so that PIP circuit 852 receives power before trigger 105. However, now, when the PIP circuit is closed/satisfied, the PIP circuit automatically delivers power to camera 160 and illumination source 170 to begin the optical recognition techniques. Thus, when a cartridge (or other such consumable) is properly installed on a torch supply connected to a power-on power supply (i.e., when parts are in place), the two implementations shown in FIGS. 9A-B and 9C-D automatically complete the optical recognition techniques discussed above in connection with FIGS. 7A-B and 7C-D (as executed by logic 314A and 314B). Then, if genuine parts have been correctly installed on the torch, the torch will fire almost immediately when a user pulls trigger 105.

Figure 9B:
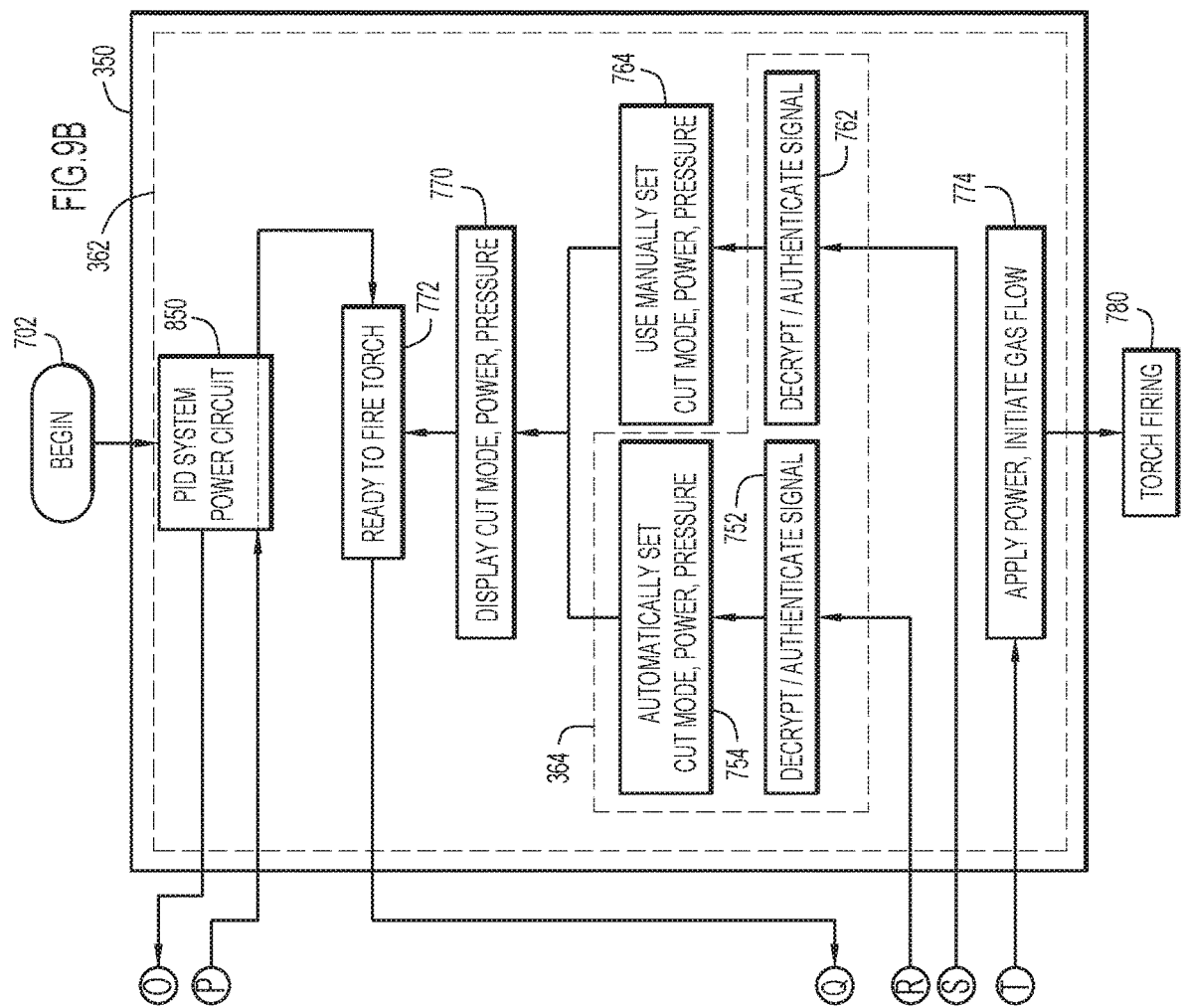

More specifically, in FIGS. 9A-B, closure of the PIP circuit 852 will signal the PID system power circuit 850 that parts in place and the PID system power circuit 850 will forward this signal to the operational logic 362 of the power supply 350 to indicate that parts in place (as shown by the arrow from 850 to 772). Meanwhile once an image of cartridge 200 has been analyzed by logic 314A and logic 314B, logic 314 will send an encrypted start signal to the smart power supply 350. Once the smart power supply 350 decrypts and processes an encrypted signal from the torch assembly 301, the smart power supply 350 will see a start signal and a PIP signal at 772. However, instead of applying the proper parameters and firing (like in at least FIGS. 7A-B and 8A-B), the smart power supply 350 will now power the trigger 105 so that an actuation of the trigger 105 results in almost immediate firing. If, on the other hand, the power supply is dumb, as is shown in FIGS. 9C-D, the power supply cannot adjust its response to receiving a start signal and PIP signal at 772. Thus, in FIGS. 9C-D, the PIP circuit 852 in the torch assembly 301 signals the PIP circuit 810 of the dumb power supply 350' and, after confirming that cartridge 200 is genuine, logic 314A signals switch 804 to deliver power to trigger 105. Then, like in FIGS. 9A-B, an actuation of the trigger 105 leads almost immediately to firing.

Overall, the implementations illustrated in FIGS. 7A-B, 7C-D, 8A-B, and 8C-D may create a bit of a delay between a trigger pull and the torch firing. However, in at least some embodiments, this delay may be less than one second, such as 200 milliseconds (ms). Moreover, in at least some embodiments, this delay may be desirable since it may replicate familiar torch operations that provide a small delay when checking safety circuits (e.g., circuits that check if parts are in place for a certain time threshold before firing). In fact, in some embodiments, the time delay created by the performance of the optical recognition techniques (as executed by logic 314A and 314B) may be insufficient and an additional delay may be built into the logic that causes the logic to wait to fire until parts have been recognized in place for a certain amount of time (e.g., 200 ms). By comparison, the implementations shown in FIGS. 9A-B and 9C-D may eliminate any delay or lag time.

Moreover, the implementations illustrated in FIGS. 7A-B and 7C-D may perform the techniques presented herein for every trigger pull while the implementations illustrated in FIGS. 8A-B, 8C-D, 9A-B, and 9C-D perform the techniques presented herein every time a part is correctly installed in place (i.e., each time PIP is satisfied). Consequently, the implementations illustrated in FIGS. 8A-B, 8C-D, 9A-B, and 9C-D may also provide an additional manner of waking the system after the system goes to sleep. As is indicated at 730', this additional manner may be disconnecting, or at least partially disconnecting, the cartridge from the torch so that the contacts of the cartridge 200 disconnect from contacts on the torch body. Breaking the connection between the contacts may reset the PIP circuit, which may reset the entire process the implementations illustrated in FIGS. 8A-B, 8C-D, 9A-B, and 9C-D.

Now turning to FIGS. 8A-B, this Figure illustrates one additional feature that could be incorporated into any implementation of the techniques presented herein, including the implementations illustrated in FIGS. 7A-B, 7C-D, 8A-B, 8C-D, 9A-B, and 9C-D. This feature is an indicator unit 854 that allow the user to understand when they can pull the trigger to initiate the optical recognition techniques and/or fire the torch. In the depicted embodiment, the indicator unit 854 is coupled directly to the torch (e.g., mounted thereon or embedded therein); however, in other embodiments, the indicator unit 854 might be adjacent to the torch (e.g., on a pendant or a cable hose extending from the torch). In either case, the indications are provided to and easily accessible/visible to a user operating the torch, regardless of a distance between the user and the power supply (e.g., even if a user is using a 100 foot lead and in a location 100 feet away from the power supply). In traditional torch setups, where all operating parameters are set at the power supply, such indications might be entirely unnecessary (since the user must be adjacent the power supply to change the operating parameters).

Moreover, in the depicted embodiment, the indicator assembly 854 includes two indicators: a PIP unsatisfied indicator 856 and a PIP satisfied indicator 858. In at least some embodiments, the PIP unsatisfied indicator 856 is a red LED and the PIP satisfied indicator 858 is a green LED. However, in other embodiments, indicator unit 854 can provide an indication of: (1) whether a torch is ready to fire in manual mode; (2) whether a torch is ready to fire in automatic mode (e.g., with automatically set operational parameters); and/or (3) whether a genuine consumable is installed in the torch, either in addition to or as an alternative to the PIP unsatisfied indicator 856 and/or the PIP satisfied indicator 858. These indications can be provided by one or more lights (e.g., LEDs) included in the torch illuminating in different colors or patterns and/or by text/images displayed on a display screen (e.g., an LED display screen) built into the torch. Regardless, due to these indications, a user would know the status of the torch, even if the user were 100 feet away from a smart or dumb power supply connected to their torch.

As an example, if the indicator unit 854 is included on one of the implementations shown in FIG. 7A-B or 7C-D, the indicator unit 854 could provide a first indication (e.g., a yellow light) when logic 314A determines that a genuine cartridge is in place and a second indication (e.g., a green light) when logic 314B determines operating parameters for the genuine cartridge. Thus, if a user sees the first indication on the torch assembly 301, the user will know that parts are in place, but operating parameters need to be set manually at the power supply 350. If, instead, the user sees the second indication on the torch assembly 301, the user will know that parts are in place and operating parameters are being set automatically at the power supply 350 (and, thus, the torch is ready for firing). Notably, the second indication will not be provided if the torch assembly 301 is connected to a dumb power supply, as shown in FIGS. 7C-D since the torch assembly 301 does not include or does not execute logic 314B when connected to a dumb power supply. Finally, if the user does not see any indications the user will know the cutting system is asleep.

By comparison, if the indicator unit 854 is included on one of the implementations shown in FIG. 8A-B, 8C-D, 9A-B, or 9C-D, the indicator unit 854 might provide a first indication (e.g., a red light) when the cartridge 200 is not in place, a second indication (e.g., a yellow light) when the cartridge 200 is in place, a third indication (e.g., one yellow light and one green light) when logic 314A determines that a genuine cartridge is in place, and a fourth indication (e.g., two green lights) when logic 314B determines operating parameters for the genuine cartridge. This combination of indications can ensure that a user knows when a trigger pull will lead to the torch firing (either immediately or subsequent to executing logic 314A and/or logic 314B). Specifically, a user will know the torch will fire after a short delay in response to a trigger actuation when the implementations of FIGS. 8A-B and 8C-D provide the second indication. Meanwhile, a user will know their torch will fire almost immediately in response to a trigger actuation when the implementations of FIGS. 9A-B and 9C-D provide the third or fourth indication (but that operating parameters need to be set manually when the third indication is provided).

Among other advantages, the techniques described and shown herein allow a user to quickly and seamlessly transition between various cutting and welding operations. The techniques presented herein also provide increased safety and better operating conditions for welding and cutting operations by automatically configuring operational parameters (e.g., power and gas transfer parameters) for the specific components currently installed on/included in a torch assembly. Consequently, inexperienced and experienced users alike need not know (or even try to find) the particular settings for every component and need not even identify and/or recognize components as they install them. That is, the techniques presented herein eliminate the need for the end user to be knowledgeable about ideal settings and/or counterfeit parts. Moreover, even if a user tries to use an unsafe or suboptimal setting, the techniques presented herein may prevent the user from doing so (since the techniques presented herein ensure that ideal settings are applied for specific operations with genuine parts). This will result in improved and more consistent performance, greater ease of use, and improved safety.

As still further examples, the techniques presented herein may inexpensively and reliably identify components. That is, at least as compared to adding electrical components to a torch component, adding a marking to a component may be considerably cheaper and at least as reliable. Moreover, the techniques do not require an additional electrical connection between the power supply and the torch assembly (as compared to typical welding/cutting operations).

To summarize, in one form a torch assembly for welding or cutting operation is presented herein, the torch assembly comprising: a torch body with an operative end configured to removably receive one or more interchangeable torch components; a memory; and a processor that executes instructions stored in the memory so that the processor: determines that the one or more interchangeable torch components are genuine; and determines operational parameters for the one or more interchangeable torch components an indicator assembly that provides a first indication when the one or more interchangeable torch components are determined to be genuine and provides a second indication when the operational parameters are to be implemented.

In another form, a system is presented herein, the system, comprising: a torch assembly including: a torch body with an operative end; an indicator assembly; a memory; and a processor that executes instructions stored in the memory; and a unitary cartridge that is removably coupleable to the operative end of the torch body, wherein the processor: determines that the unitary cartridge is genuine; causes the indicator assembly to provide a first indication based on a determination that the unitary cartridge is genuine; and sends a start signal to a power supply based on the determination that the unitary cartridge is genuine, the start signal causing the power supply to deliver power and gas to the torch assembly.

In yet another form, a method is presented herein, the method comprising: determining that one or more interchangeable torch components installed in an operative end of a torch are genuine; determining operational parameters for the one or more interchangeable torch components; activating an indicator assembly to provide a first indication when the one or more interchangeable torch components are determined to be genuine; and activating the indicator assembly to provide a second indication when the operational parameters are implemented at a power supply connected to the torch.

Although the techniques are illustrated and described herein as embodied in one or more specific examples, the specific details of the examples are not intended to limit the scope of the techniques presented herein, since various modifications and structural changes may be made within the scope and range of the invention. In addition, various features from one of the examples discussed herein may be incorporated into any other examples. Accordingly, the appended claims should be construed broadly and in a manner consistent with the scope of the disclosure.

We claim:

1. A torch assembly for welding or cutting operations, comprising:
    a torch body with an operative end configured to removably receive one or more interchangeable torch components;
    a memory;
    a processor that executes instructions stored in the memory so that the processor:
        determines that the one or more interchangeable torch components are genuine; and
        determines operational parameters for the one or more interchangeable torch components; and
    an indicator assembly that provides a first indication when the one or more interchangeable torch components are determined to be genuine and provides a second indication when the operational parameters are to be implemented.

2. The torch assembly of claim 1, wherein the processor further:
    determines if the one or more interchangeable torch components are properly installed in the torch body.

3. The torch assembly of claim 2, wherein the indicator assembly provides a third indication when the one or more interchangeable torch components are determined to be properly installed in the torch body.

4. The torch assembly of claim 2, wherein the processor determines that the one or more interchangeable torch components are genuine and determines the operational parameters after the one or more interchangeable torch components being determined to be properly installed in the torch body.

5. The torch assembly of claim 1, wherein the torch assembly further comprises:
    a trigger, wherein the processor executes the instructions stored in the memory in response to an actuation of the trigger.

6. The torch assembly of claim 5, wherein the processor executes the instructions in response to the actuation of the trigger after the one or more interchangeable torch components are properly installed in the torch body.

7. The torch assembly of claim 1, wherein the processor executes the instructions in response to the torch assembly receiving power.

8. The torch assembly of claim 1, wherein the processor further:
    instructs a power supply controlling delivery of power and gas to the torch assembly to use the operational parameters determined by the processor.

9. The torch assembly of claim 1, wherein the one or more interchangeable torch components comprise a unitary cartridge.

10. The torch assembly of claim 1, wherein the indicator assembly:
    deactivates the first indication prior to providing the second indication.

11. A system, comprising:
    a torch assembly including:
        a torch body with an operative end;
        an indicator assembly;
        a memory; and
        a processor that executes instructions stored in the memory; and
    a unitary cartridge that is removably coupleable to the operative end of the torch body,
    wherein the processor:
        determines that the unitary cartridge is genuine;
        causes the indicator assembly to provide a first indication based on a determination that the unitary cartridge is genuine; and
        sends a start signal to a power supply based on the determination that the unitary cartridge is genuine, the start signal causing the power supply to deliver power and gas to the torch assembly.

12. The system of claim 11, wherein the start signal causes the power supply to automatically set parameters of the power and the gas sent to the torch assembly.

13. The system of claim 12, wherein the processor further:
    causes the indicator assembly to provide a second indication when the start signal causes the power supply to automatically set the parameters of the power and the gas.

14. The system of claim 13, wherein the processor further:
    deactivates the first indication prior to causing the indicator assembly to provide the second indication.

15. The system of claim 11, wherein the processor further:
    assesses parts-in-place for the unitary cartridge; and
    causes the indicator assembly to provide a third indication based on an assessment of parts-in-place.

16. The system of claim 15, wherein the processor further:
    sends a parts-in-place signal to the power supply when the assessment of parts-in-place for the unitary cartridge determines the unitary cartridge is properly installed in the torch body.

17. The system of claim 15, wherein the unitary cartridge includes one or more cartridge contacts, the torch body includes one or more torch contacts and the assessment of parts-in-place comprises determining whether the one or more cartridge contacts are in contact with the one or more torch contacts.

18. A method comprising:
    determining that one or more interchangeable torch components installed in an operative end of a torch are genuine;
    determining operational parameters for the one or more interchangeable torch components;

activating an indicator assembly to provide a first indication when the one or more interchangeable torch components are determined to be genuine; and activating the indicator assembly to provide a second indication when the operational parameters are implemented at a power supply connected to the torch.

19. The method of claim 18, wherein the first indication is deactivated when the second indication is activated.

20. The method of claim 18, further comprising:

assessing parts-in-place for the one or more interchangeable torch components; and causing the indicator assembly to provide a third indication based on an assessment of parts-in-place.

* * * * *